US012476379B1

(12) United States Patent
Khushrushahi

(10) Patent No.: US 12,476,379 B1
(45) Date of Patent: Nov. 18, 2025

(54) ADJUSTABLY TRANSMISSIVE, REFLECTIVE, AND ABSORPTIVE METAMATERIALS

(71) Applicant: Notch, Inc., Cambridge, MA (US)

(72) Inventor: Shahriar Khushrushahi, Cambridge, MA (US)

(73) Assignee: Notch, Inc., Cambridge, MA (US)

( * ) Notice: Subject to any disclaimer, the term of this patent is extended or adjusted under 35 U.S.C. 154(b) by 281 days.

(21) Appl. No.: 18/070,169

(22) Filed: Nov. 28, 2022

Related U.S. Application Data

(60) Provisional application No. 63/303,626, filed on Jan. 27, 2022, provisional application No. 63/303,651, filed on Jan. 27, 2022.

(51) Int. Cl.
*H01Q 15/00* (2006.01)
*H01Q 17/00* (2006.01)
*H01Q 21/00* (2006.01)

(52) U.S. Cl.
CPC ......... *H01Q 15/0086* (2013.01); *H01Q 17/00* (2013.01); *H01Q 21/00* (2013.01)

(58) Field of Classification Search
CPC ..... H01Q 15/0086; H01Q 21/00; H01Q 17/00
See application file for complete search history.

(56) References Cited

U.S. PATENT DOCUMENTS 8,339,320 B2 12/2012 Sievenpipier
8,633,866 B2 1/2014 Sarabandi et al.
(Continued)

FOREIGN PATENT DOCUMENTS

CN 104264502 A 1/2015
CN 204125790 U 1/2015
(Continued)

OTHER PUBLICATIONS

Gebrebrhan et al., "Textile Frequency Selective Surface", IEEE Microwave and Wireless Components Letters, vol. 27, No. 11, Nov. 2017, pp. 989-991.

(Continued)

*Primary Examiner* — Dameon E Levi
*Assistant Examiner* — Aladdin Abdulbaki
(74) *Attorney, Agent, or Firm* — Sunstein LLP

(57) ABSTRACT

Wireless devices are commonly carried in fabric-based apparel. Printing metamaterial structures on fabric substrates allows for the ability to create fabric metamaterial layers. A reconfigurable RF based fabric system simply by physically removing or adding different fabric-based metamaterial layers to different regions of the apparel. The fabric-based metamaterial can be used in various filtering applications where the control of phase, reflection angle, refraction angle, polarization, absorption, and transmission of the impinged electromagnetic wave can all be manipulated. Additionally, sophisticated metamaterial systems can be created by combining different metamaterial layers separated above each other. A controllable absorber metamaterial system can be made consisting of two layers. The first layer an electronically controllable that can controllably change between a band-pass and band-reject filter in a relevant frequency band and a second absorptive layer. Vehicles with adjustable metamaterial absorber systems, integrated on the outside or inside of the RF transparent fuselage, have the ability to control their radar cross section dynamically for the purposes of evading detection or spoofing their size by looking larger or similar to vehicles of different radar cross section.

8 Claims, 22 Drawing Sheets

(56) References Cited

U.S. PATENT DOCUMENTS

| | | | |
|---|---|---|---|
| 9,603,243 B2 | 3/2017 | Kaplan et al. | |
| 10,931,252 B2 * | 2/2021 | Stevens | H01P 1/20381 |
| 11,041,936 B1 * | 6/2021 | Wall | H01Q 1/425 |
| 2021/0344109 A1 | 11/2021 | Ho et al. | |

FOREIGN PATENT DOCUMENTS

| | | | |
|---|---|---|---|
| CN | 112864630 A * | 5/2021 | H01Q 15/002 |
| IT | PI20080014 A1 | 5/2008 | |
| WO | 2021/216673 A1 | 10/2021 | |

OTHER PUBLICATIONS

Costa et al., "Analysis and Design of Ultra Thin Electromagnetic Absorbers Comprising Resistively Loaded High Impedenace Surfaces", IEEE Transactions of Antennas and Propagation, vol. 58, No. 5, May 2010, pp. 1551-1558.

Costa et al., "A Frequency Selective Radome with Wideband Absorbing Properties", IEEE Transactions on Antennas and Propagation, vol. 60, No. 6, Jun. 2012, pp. 2740-2747.

Costa et al., "Electromagnetic Absorbers based on High-Impedance Surfaces: from ultra-narrowband to ultra-wideband absorption", Advanced Electromagnetics, vol. 1, No. 3, Oct. 2012, pp. 7-12.

Zadeh et al., "Capacitive Circuit Method for Fast and Efficient Design of Wideband Radar Absorbers", IEEE Transactions on Antennas and Propagation, vol. 57, No. 8, Aug. 2009, pp. 2307-2314.

Kazemzadeh, "Nonmagnetic Ultrawideband Absorber with Optimal Thickness", IEEE Transactions on Antennas and Propagation, vol. 59, No. 1, Jan. 2011, pp. 135-140.

Whittow et al., "Printed Frequency Selective Surfaces on Textiles", Electronics Letters, vol. 50, No. 13, Jun. 19, 2014, pp. 916-917.

* cited by examiner

ADJUSTABLY TRANSMISSIVE, REFLECTIVE, AND ABSORPTIVE METAMATERIALS

RELATED APPLICATIONS

The present application claims the benefit of provisional application Ser. No. 63/303,651, filed Jan. 27, 2022 and provisional application Ser. No. 63/303,626, filed Jan. 27, 2022. Each of these related applications is hereby incorporated herein by reference in its entirety.

STATEMENT REGARDING FEDERALLY SPONSORED RESEARCH OR DEVELOPMENT

The inventions herein have been made with U.S. Government support under Agreement No. W15QKN-16-3-0001 awarded by the ACC-NJ and under Contract Number FA864920P1015 awarded by the U.S. Air Force. The U.S. Government has certain rights in these inventions.

TECHNICAL FIELD

The present invention relates to metamaterials and their construction to create an adjustable frequency selective transmissivity, reflection, and or absorption of Radio Frequency (RF) energy. For fabric-based metamaterial systems, consisting of multiple metamaterial layers, individual layers can be removed or reattached to change the RF response of the metamaterial system from band-pass to band-reject, or vice versa, in a desired frequency band. This fabric-based metamaterial system can be used to create control over the frequency selective behavior of a fabric-based apparel creating an RF reconfigurable system for a desired application that includes frequency-selective reflection, absorption, and transmission of received signals, increasing the directionality of antenna systems, and reduction of EMI in fabric-based wearable devices. The fabric-based metamaterial layers are constructed using conductive traces using inks or fibers or other means. Additionally, by using different metamaterial layers as building blocks placed some distance above each other, sophisticated RF behavior can be achieved. A metamaterial system that can controllably adjust its reflection and absorption in a relevant frequency band, for the purposes of dynamically changing the Radar Cross Section (RCS) of a vehicle.

BACKGROUND ART

As is known in this art, metamaterials are materials engineered to have properties not found in natural materials. They are constructed using arrays of periodic conductive structures that are sub-wavelength of the phenomena they influence and derive their properties from these structures. Metamaterials can be designed to manipulate the phase, magnitude, and polarization of impinged, reflected, and transmitted Radio Frequency (RF) waves or to create frequency selective behavior and absorptive behavior. They are constructed by patterning periodic conductive structures on a substrate. For fabric-based metamaterials, the conductive structures can be manufactured using conductive inks, conductive thread, conductive tape, or other means.

Conventionally, metamaterial structures are constructed on printed circuit board substrates. The different printed circuit board layers that comprise the entire metamaterial structure are fixed and embedded into the substrate making it difficult to manipulate and change the frequency selective behavior of the system dynamically and physically except through electronic means through an applied voltage or current applied to PIN diodes, varactors, or FETs integrated on the metamaterial structure. By creating a fabric-based metamaterial system, this reconfigurability can be rapidly achieved through the addition or removal of different fabric metamaterial layers as is needed for the desired RF response for the application. Additionally, adding two or more metamaterial layers separated by some distance, each layer with its own RF controllable response, can create sophisticated controllable RF behavior.

U.S. Pat. No. 8,633,866 B2 discloses metasurfaces as sub-wavelength frequency-selective surface structures.

U.S. Pat. No. 8,339,320 B2 discloses tunable frequency selective surfaces.

Italian Pat. No. 20080014 Aq discloses electromagnetic absorbers made with high impedance active surfaces.

World Patent WO 2021/216673A1 discloses the integration of electronic components in fibers for fabrics for electronic actuation.

Chinese Pat. No. 104264502A and CN204125790U discloses a method to create a single layer of fabric-based metamaterial.

Chinese Pat. No. 112864630A discloses a method of tuning fabric-based metamaterials by laterally moving identical fabric-based layers to change the overall dimensions of the periodic elements and tune the frequency selective behavior.

U.S. Pat. No. 9,603,243 B2 discloses a method of fabricating silk-based metamaterials.

U.S. Pat. No. 2021/0344109 A1 discloses the use of metamaterial structures on fabric to create surface modes to better guide wireless signals to end devices for connectivity.

Academic paper "Textile Frequency Selective Surfaces" by Gatesman et. al. discloses textile based FSS on woven textiles for terahertz applications.

Academic paper: Costa, Filippo, et al. "Analysis and Design of Ultra Thin Electromagnetic Absorbers Comprising Resistively Loaded High Impedance Surfaces." IEEE Transactions on Antennas and Propagation, vol. 58, no. 5, May 2010, pp. 1551-58. IEEE Xplore, https://doi.org/10.1109/TAP.2010.2044329.

Academic paper: Costa, Filippo, and Agostino Monorchio. "A Frequency Selective Radome With Wideband Absorbing Properties." IEEE Transactions on Antennas and Propagation, vol. 60, no. 6, June 2012, pp. 2740-47. IEEE Xplore, https://doi.org/10.1109/TAP 2012 2194640.

Academic paper: Kazem Zadeh, Alireza, and Anders Karlsson. "Capacitive Circuit Method for Fast and Efficient Design of Wideband Radar Absorbers." IEEE Transactions on Antennas and Propagation, vol. 57, no. 8, August 2009, pp. 2307-14. IEEE Xplore, https://doi org/10.1109/TAP.2009.2024490.

Academic paper: Kazemzadeh, Alireza. "Nonmagnetic Ultrawideband Absorber With Optimal Thickness." IEEE Transactions on Antennas and Propagation, vol. 59, no. 1, January 2011, pp. 135-40. IEEE Xplore, https://doi.org/10.1109/TAP.2010.2090481.

Academic paper "Printed frequency selective surfaces on textiles" by Tudor et. al. for inkjet printing frequency selective surfaces on textiles at S band frequencies.

SUMMARY OF THE EMBODIMENTS

In one embodiment, the invention is a fabric-based metamaterial system comprising a first layer including a first fabric-based metamaterial that is normally transmissive; and a second layer including a second fabric-based metamaterial; wherein the second layer removably underlies a region of the first layer in a manner as to render the first layer reflective in the region.

Optionally, a method of modifying properties of a region of a first fabric-based metamaterial that is normally transmissive over a relevant frequency band, the method comprising causing a second fabric-based metamaterial to underly the region of the first normally transmissive fabric-based metamaterial in a manner as to render the region reflective over the relevant frequency band.

As a further option, a method of modifying properties of the region of the fabric-based metamaterial system, such fabric-based metamaterial system being configured to be reflective over a relevant frequency band, the method comprising causing the second fabric-based metamaterial layer to be removed from the region of the reflective fabric-based metamaterial system in a manner as to render the region of the fabric-based metamaterial system transmissive over the relevant frequency band.

Also optionally, a method of modifying properties of a fabric-based metamaterial system, wherein a selected one of the first and second layers is stretchable, the method comprising stretching the selected one of the layers.

Optionally, the fabric-based metamaterial system is incorporated in an item selected from the group consisting of an item of apparel, a tent, a parachute, a bag, and an enclosure.

In another embodiment, the invention is a fabric-based metamaterial system comprising a first layer including a first fabric-based metamaterial that is normally reflective and a second layer including a second fabric-based metamaterial wherein the second layer removably underlies a region of the first layer in a manner as to render the first layer transmissive in the region.

Optionally, a method of modifying properties of a region of a first fabric-based metamaterial that is normally reflective over a relevant frequency band, the method comprising causing a second fabric-based metamaterial to underly the region of the first normally reflective fabric-based metamaterial in a manner as to render the region transmissive over the relevant frequency band.

As a further option, a method of modifying properties of the region of the fabric-based metamaterial system, such fabric-based metamaterial system being configured to be transmissive over a relevant frequency band, the method comprising causing the second fabric-based metamaterial layer to be removed from the region of the transmissive fabric-based metamaterial system in a manner as to render the region of the fabric-based metamaterial system reflective over the relevant frequency band.

Also optionally, a method of modifying properties of a fabric-based metamaterial system, wherein a selected one of the first and second layers is stretchable, the method comprising stretching the selected one of the layers.

Optionally, the fabric-based metamaterial system is incorporated in an item selected from the group consisting of an item of apparel, a tent, a parachute, a bag, and an enclosure.

In another embodiment, the invention is a fabric-based metamaterial system comprising a plurality of layers of fabric-based metamaterial layers, wherein each layer has a distinct spacing in relation to a next subsequent layer, and the distinct spacing being configured to produce a desired RF response.

Optionally, a method of controlling RF behavior of a fabric-based item, the method comprising causing distribution of fabric-based metamaterial layers over a surface of the fabric-based item in order to define desired regions of RF transmission, RF absorption, and RF reflection over the surface to produce a desired RF behavior.

In another embodiment, the invention is an antenna system comprising an omnidirectional antenna array, a first layer including a first fabric-based metamaterial that is normally transmissive, the first layer at least partially surrounding the antenna array, and a second layer including a second fabric-based metamaterial, wherein the second layer removably underlies a region of the first layer in a manner as to render the first layer reflective in the region, wherein the first and second layers are configured to create a directional antenna pattern in conjunction with the antenna array.

In another embodiment, the invention is an antenna system comprising a directional antenna array, a first layer including a first fabric-based metamaterial that is normally transmissive, the first layer at least partially surrounding the antenna array, and a second layer including a second fabric-based metamaterial, wherein the second layer removably underlies a region of the first layer in a manner as to render the first layer reflective in the region; wherein the first and second layers are configured to minimize back lobes and side lobes in conjunction with the antenna array.

In another embodiment, the invention is a metamaterial system for integration into an object comprising a first metamaterial layer configured to be controllably reflective; and a second metamaterial layer configured to be absorptive; wherein the first metamaterial layer overlies the second metamaterial layer so as to enable controlling a radar cross section of the object.

Optionally, the metamaterial system is incorporated in a vehicle.

In another embodiment, the invention is an antenna system comprising an antenna array; a first layer including a first fabric-based metamaterial that is normally reflective, the first layer at least partially surrounding the antenna array; and a second layer including a second fabric-based metamaterial, wherein the second layer removably underlies a region of the first layer in a manner as to render the first layer transmissive in the region; wherein the first and second layers are configured to maintain the same antenna pattern in conjunction with the antenna array.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1A:
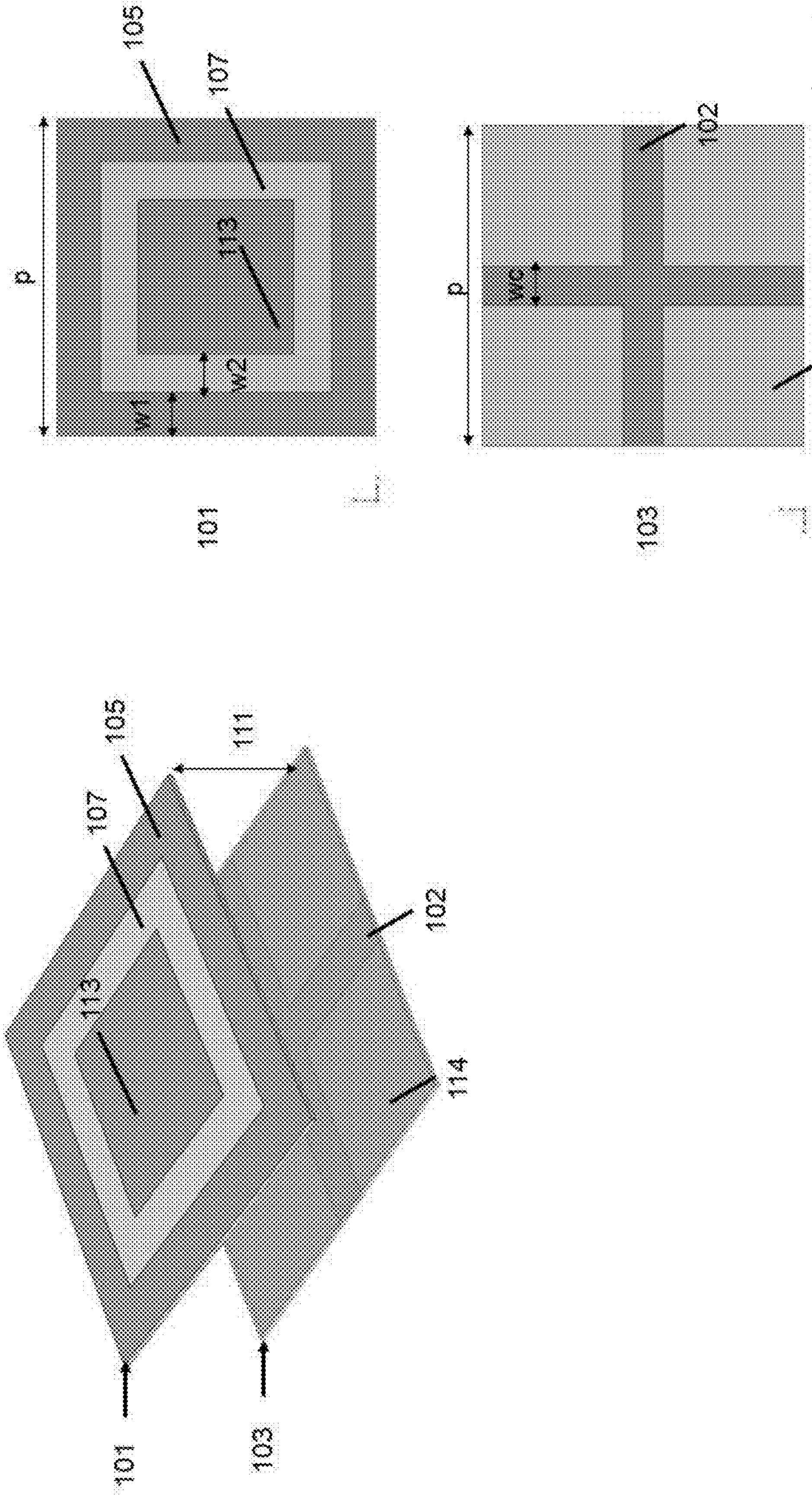
FIG. 1A is an embodiment illustrating two square unit cells that comprises an adjustable fabric metamaterial system made of two layers of fabric metamaterials with the first layer comprised of a band-pass metamaterial cell.

Definitions. As used in this description and the accompanying claims, the following terms shall have the meanings indicated, unless the context otherwise requires:

A “set” includes at least one member.

An “antenna array” is a set of interconnected antenna elements that can generate an isotropic, omnidirectional, or even directional radiation pattern.

“Electrical control” or “electronic control” of a metamaterial is control, achieved using applied voltage and/or current, of a property of the metamaterial or any component thereof, the addition of a PIN diode, a PN diode, a varactor diode, a light-emitting diode, a transistor, a FET switch, a MEM switch or other non-linear or linear switching element, and combinations thereof including series and parallel circuit combinations.

A “metamaterial” is an engineered material in a member selected from the group consisting of a surface, a volume, and combinations thereof, by virtue of a set of cells organized in a repeated pattern in the material. Metamaterials can be designed to have frequency selective behavior tuned at a resonant frequency, to exhibit filter characteristics such as band-pass, band-reject, high pass, low pass, and combinations thereof. They can be designed to affect the phase, magnitude, bandwidth, and polarization of impinged, reflected, and transmitted electromagnetic waves. These properties of the metamaterial, including the tuned resonant frequency, can be modified by mechanical control, magnetic control, electrical control or electronic control and combinations thereof; these forms of control may be active or passive. Optionally, the set of cells of the metamaterial organized in a repeated pattern is infinitely dense so as to constitute a ground plane.

A “fabric-based metamaterial” is a metamaterial that is implemented as a part of a fabric.

A “fabric” may be a woven material or a non-woven material or a combination of woven and non-woven materials.

A “normally transmissive” fabric-based metamaterial is a fabric configured by a set of conductive loops or other means to become transmissive of RF energy over a relevant frequency band.

A “normally transmissive” fabric-based metamaterial is made reflective when RF energy, over a relevant frequency band, otherwise transmissive by the metamaterial is not enabled to pass through and is reflected by the material.

A “normally reflective” fabric-based metamaterial is a fabric configured by a set of conductive loops or other means to become reflective of RF energy over a relevant frequency band.

A “normally reflective” fabric-based metamaterial is made transmissive when RF energy, over a relevant frequency band, otherwise reflective by the metamaterial is enabled to pass through and is transmitted by the material.

A metamaterial is "transmissive" if it is configured to transmit at least some of the RF energy incident thereon, even though some of the RF energy is absorbed or reflected.

A metamaterial is "reflective" if it is configured to reflect at least some of the RF energy incident thereon, even though some of the RF energy is absorbed or reflected.

A "fabric-based metamaterial grid" is a fabric-based metamaterial including a set of conductive elements arranged in a grid.

A "reconfigurable antenna unit" has an antenna array, a set of metamaterial panels configured to surround the antenna array and a system to control separately at least one property of each of the metamaterial panels, wherein the system is selected from the group consisting of (i) a control unit coupled to each of the metamaterial panels for selectively addressing each of the panels for purposes of control, (ii) and an arrangement supporting physical attachment and removal of passive metamaterial layers, and (iii) combinations thereof.

To "control a property of the metamaterial" is to control a parameter associated with the metamaterial in connection with a wave impinging, reflected, or transmitted thereon, the parameter selected from the group consisting of transmissivity, reflectivity, absorption, phase of transmitted wave, angle of reflection, polarization, bandwidth, resonant frequency, angle of refraction, and combinations thereof.

To "absorb" electromagnetic wave means to either convert the electromagnetic energy into heat using resistive elements or reflecting the electromagnetic wave to destructively interfere with the impinged energy, for the purposes of reducing reflection off the metamaterial surface and reducing transmission through the surface.

A "substrate" can include fabric, glass, FR4 or circuit board substrates, fiberglass, and other materials, woven or non-woven, that the metamaterial's conductive pattern can be embedded on or suspended on.

A "conductive layer" is a layer comprised of any material that creates an electrically conductive layer on a substrate. For fabric substrates, this includes the application of conductive inks, conductive fibers, affixed conductive metals or solids, and combinations thereof.

A "conductive plane" is a layer that is fully comprised of any material that creates is electrically conductive on a substrate. For fabric substrates, this includes the application of conductive inks, conductive fibers, affixed conductive metals or solids, and combinations thereof.

An "active element" includes semiconductor devices such as FET switches, transistors, PN diodes, PIN diodes, varactor diodes, light-emitting diodes used independently or in combination with other active elements in series or parallel circuit combinations. The diodes can be configured to operate in reverse and or forward bias. Other lumped elements can also be connected to the electronically controllable active element such as resistors, capacitors, and inductors as is needed.

"Frequency band" is a continuous uninterrupted frequency range, that the metamaterial is tuned for, spanning from a minimum frequency to a maximum frequency.

"Resonant frequency band" is a frequency band or multi-band for which the metamaterial is tuned.

"Bandwidth" of a metamaterial is the range of a frequency band, for which the metamaterial is tuned, and is the difference between the maximum and minimum frequency in the frequency band.

A "center frequency" of a metamaterial is a single frequency that is in the center of the resonant frequency band for which the metamaterial is tuned.

"Multi-band" of a metamaterial is a set of frequency bands centered at different center frequencies with different bandwidths.

A "passive" control is control achieved without the continuous application of power, although power may be applied initially in changing a geometric feature or other configuration.

An "active" control is control achieved through the sustained application of power over time.

A "filter" is a metamaterial that can have filter characteristics that can be band-pass, band-reject, all pass, or all-reject. An all-pass filter can be without any conductive regions. An all-reject filter can be a conductive layer equivalent to a fully conductive plane.

"Mechanical control" of a metamaterial is control, achieved using any mechanically based technology, of a property of the metamaterial by causing a physical change in a dimension, location, or orientation of any component of the metamaterial. "Mechanical control" includes control achieved by a magnetic, electric, or electromagnetic force to effectuate such a change, including by use of a shape-memory alloy, a tunable material, or a mechanical actuator.

To "selectively address" a set of cells means to control separately at least one property of each of the metamaterial cells in the set.

A "via" is a conductor connecting at least one conductive segment in one layer to another conductive segment in another layer.

A "functional conductive structure" is a part of a metamaterial cell, wherein the part is disposed in a plane and includes conductive structures and active elements.

In accordance with embodiments of the present invention, methods and apparatus are disclosed for constructing adjustably transmissive, reflective, and absorptive metamaterials to radio frequency energy. The adjustably refers to the ability to change the frequency band and the magnitude of transmissivity, reflection, and absorption through mechanical control or electronic control of the metamaterial. The metamaterials are constructed by creating periodic electrically conductive patterns on different layers of dielectric substrate and combining these layers to give specific transmission, reflectivity, or absorption in a frequency band. The substrates can be chosen to be rigid or flexible to create any conformal shape as is desired. The conductive layers can be constructed on various substrates through various processes that are reductive or additive in nature. A reductive process includes etching copper into patterns on a printed circuit board (PCB) substrate such as FR-4. An additive process includes printing conductive inks on a substrate, such as printing conductive inks in specific patterns on fabric materials or other materials. The method of adjusting the RF response of the metamaterial can be done by mechanical control, such as attaching or removing different fabric metamaterial layers from an existing fabric-based metamaterial apparel. This enables the ability of reconfiguring the RF characteristics of any fabric-based item. An example is a tent made of a fabric-based metamaterial designed to reflect or block a certain jamming frequency band or to hide equipment from synthetic aperture radar on board flying aircraft or satellites. The fabric-based metamaterial that makes up the tent is made of two layers of fabric metamaterials, and the individual layers can be removed. By removing layers in different regions of the tent, different regions of the tent can be made transparent to a desired frequency band while keeping the other regions reflective/blocking that frequency band. This allows for the creation of an RF reconfigurable tent as needed for satellite equipment and antennas enclosed by the tent. The same idea can be applied to the lining of bags carrying communication, positioning, or other RF equipment. Another method of adjusting the RF response is by using electrical control to control a property of the metamaterial.

By using two or more metamaterial layers positioned one above the other, sophisticated RF behavior can be created that is electronically controlled. One such ability is to use an electronically controllable metamaterial, that can be controlled to be transmissive or reflective in a frequency band of interest, positioned above another metamaterial that is absorptive in that frequency band creating a controllable absorber metamaterial. The electronic control enables the control from reflection to absorption of the impinged RF energy in a frequency band of interest. By using multiple such controllable absorber metamaterials to cover areas of a vehicle, the radar cross section of the vehicle can be controllably modified to increase or decrease with the purpose of spoofing a radar cross section similar to other vehicles or being undetected respectively.

Figure 1B:
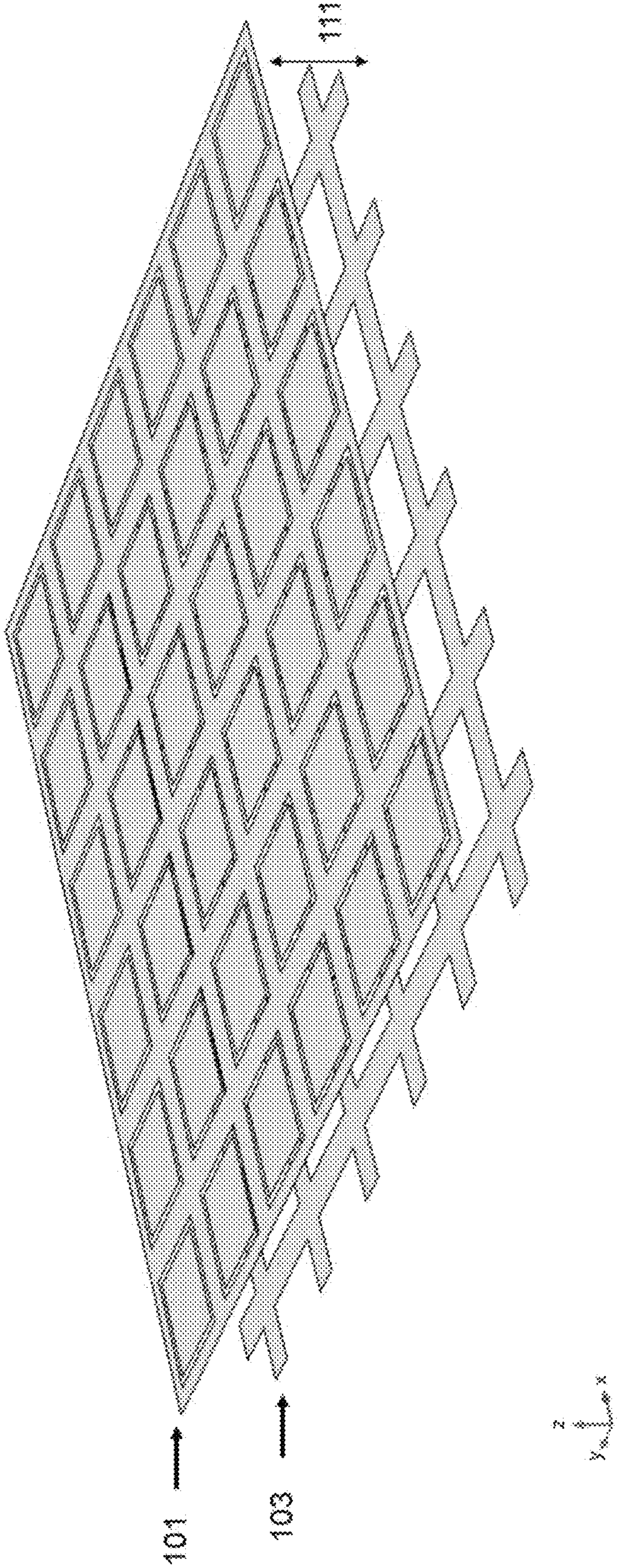
FIG. 1B is an embodiment of the resulting fabric-based metamaterial system comprised of a periodic array of these unit cells resulting in two fabric metamaterial layers.

A metamaterial fabric layer configured to be a band-pass filter, can be used to construct a fabric-based metamaterial system that can adjustably change from a transmissive fabric-based metamaterial to a reflective fabric-based metamaterial, or vice versa, in a desired frequency band. FIG. 1A are two square unit cells that comprises an adjustable fabric metamaterial system made of two layers of fabric metamaterials with the first layer comprised of a band-pass metamaterial cell. The two unit cells, 101 and 103, represent fabric unit cells on independent fabric layers that can be separated for the purposes of changing its frequency response. The two layers are vertically separated by a distance 111 by either inserting a set of RF transparent fabric in between to achieve the appropriate distance 111 or are held at that distance through the application of some thick adhesive or a hook and loop/Velcro® mechanism. Changing the distance 111 by inserting or removing different layers of RF transparent fabric to mechanically control a property of the fabric-based metamaterial system that includes frequency band and magnitude of transmissivity, reflection, absorption, and phase. The square unit cell on the first layer, 101, has a periodicity ‘p’ and is made of an outer conductive loop 105 with width ‘w1’ and an inner conductive patch 113 separated by a non-conductive fabric 107 of width ‘w2’. The second metamaterial layer unit cell, 103, has the same periodicity ‘p’ and is made of a conductive grid 102 with width ‘wc’ with the remaining fabric sections of the cell 114 not conductive. The unit cells, 101 and 103, do not have to have identical periodicities and can have periodicities that are different, or dimensional multiples of each other. FIG. 1B is the resulting fabric-based metamaterial system comprised of a periodic array of these unit cells, from FIG. 1A, resulting in two fabric metamaterial layers. The two fabric metamaterial layers 101 and 103 are separated by the distance 111 and can independently removed or re-attached to adjust its RF response.

Figure 1C:
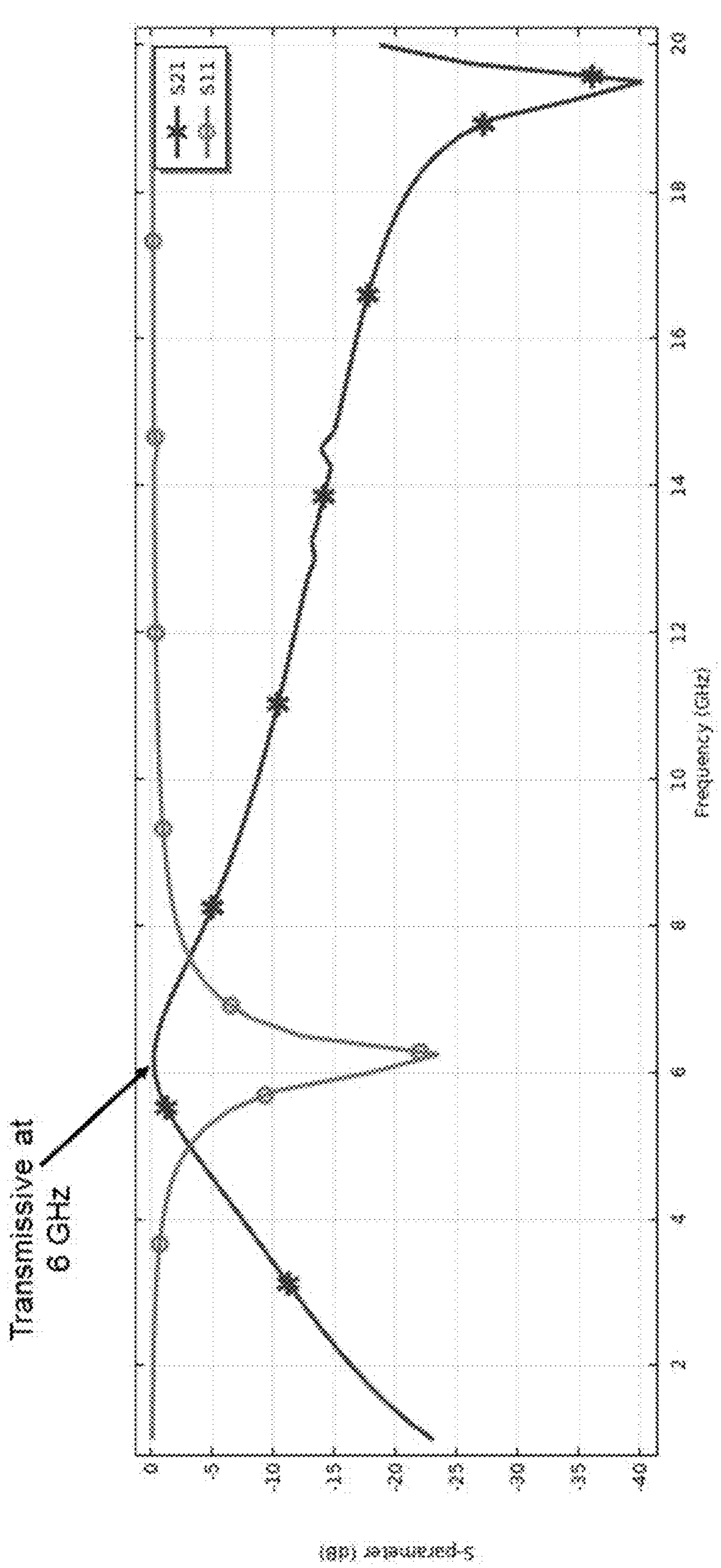
FIG. 1C illustrates the frequency response of the fabric metamaterial system of FIG. 1A configured to have just the first metamaterial layer.
Figure 1D:
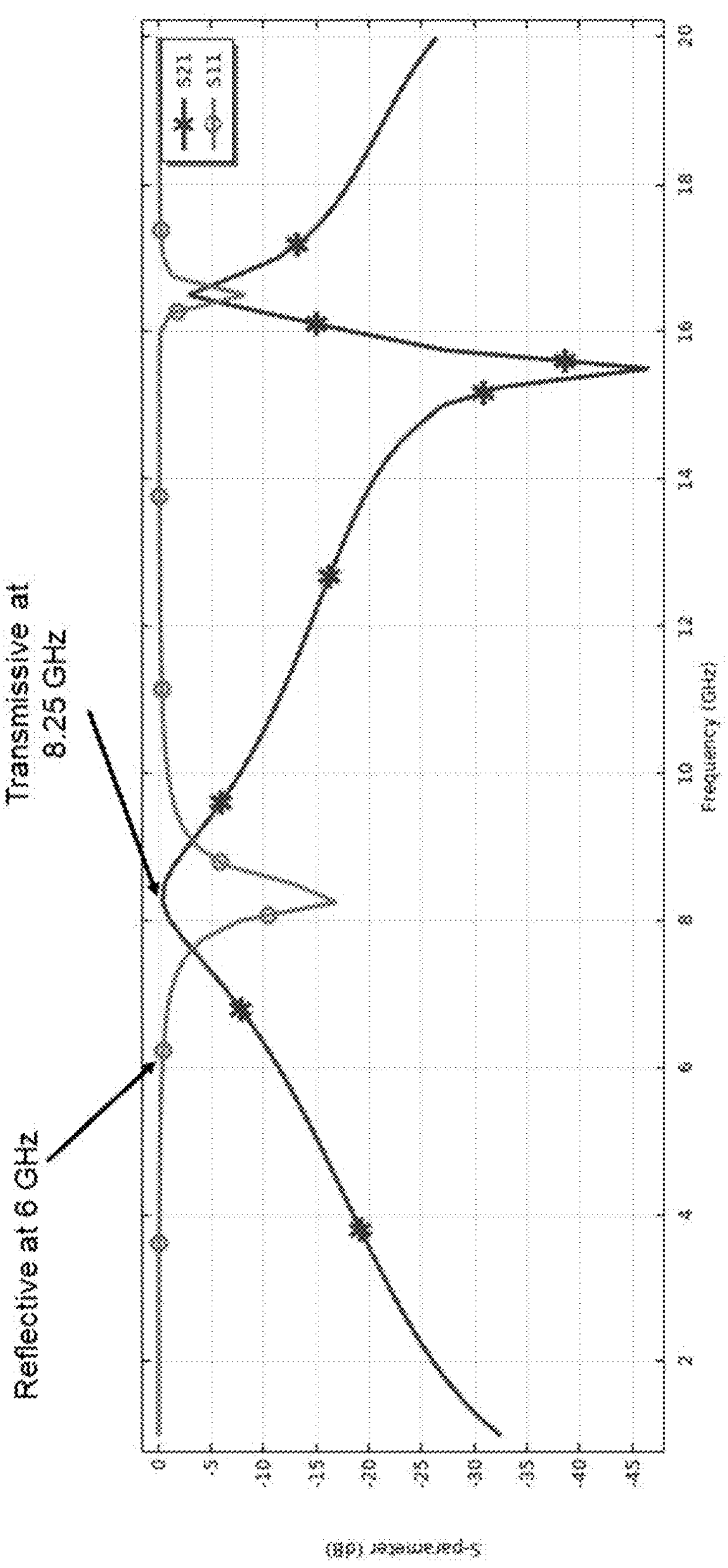
FIG. 1D is the result of adding the second fabric metamaterial layer of FIG. 1A, to the fabric metamaterial system, changing the band-pass frequency response by moving the transmissive frequency band to 8.25 GHz and is now a band-reject filter, reflective at the original frequency band of 6 GHz.

FIG. 1C illustrates the frequency response of the fabric metamaterial system of FIG. 1A configured to have just the first layer 101. The frequency response of the system is a band-pass filter with a transmissive frequency band at 6 GHz. FIG. 1D is the result of adding the second fabric metamaterial layer, 103, of FIG. 1A, to the fabric metamaterial system, changing the band-pass frequency response by moving the transmissive frequency band to 8.25 GHz and is now a band-reject filter, reflective at the original frequency band of 6 GHz. The two fabric-based metamaterial layers are also separated by a distance equivalent to that of an RF transparent fabric substrate placed in between.

Figure 2A:
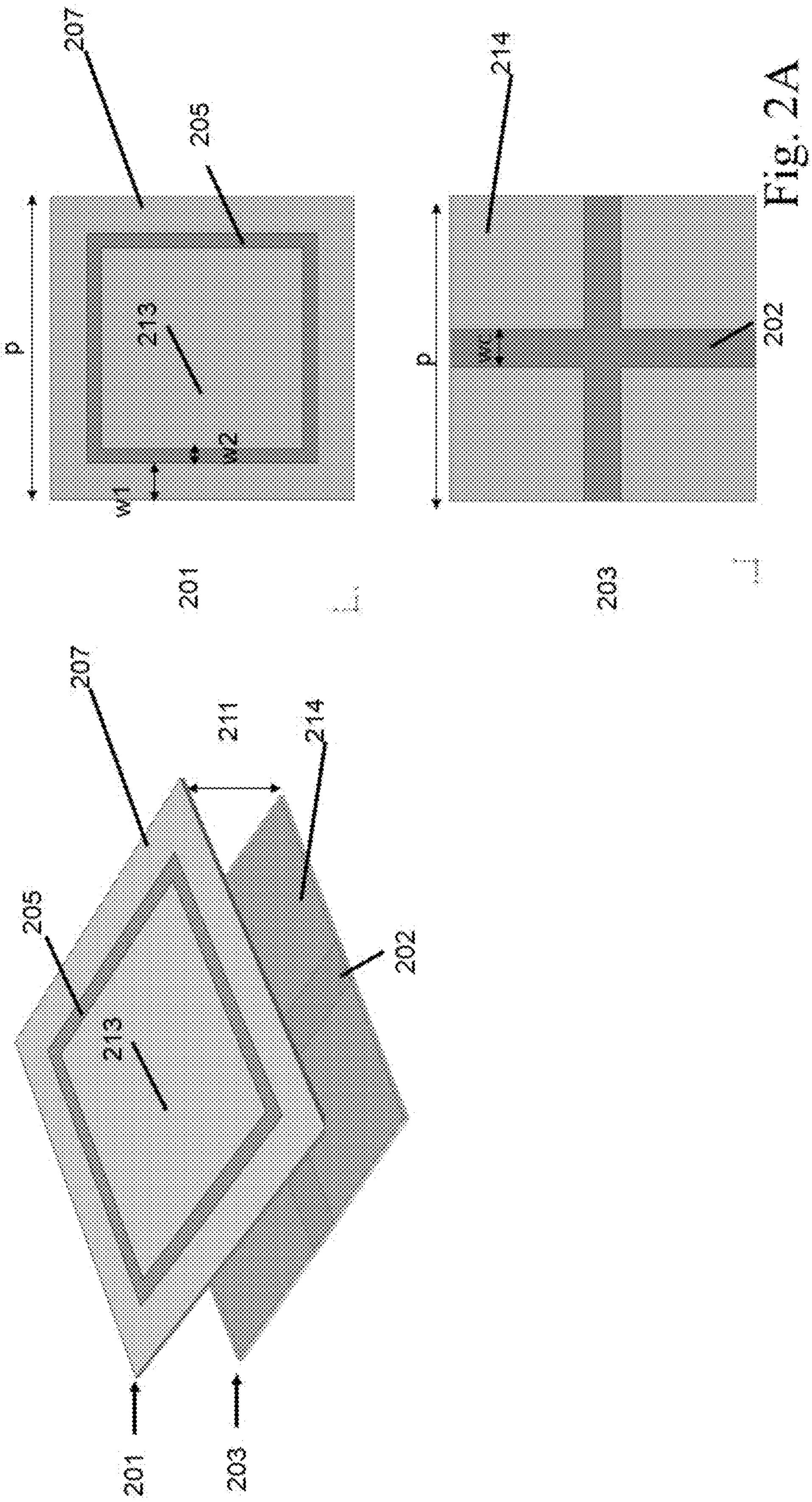
FIG. 2A are two square unit cells that comprises an adjustable fabric metamaterial system made of two layers of fabric metamaterials with the first layer comprised of a band-reject metamaterial cell.
Figure 2B:
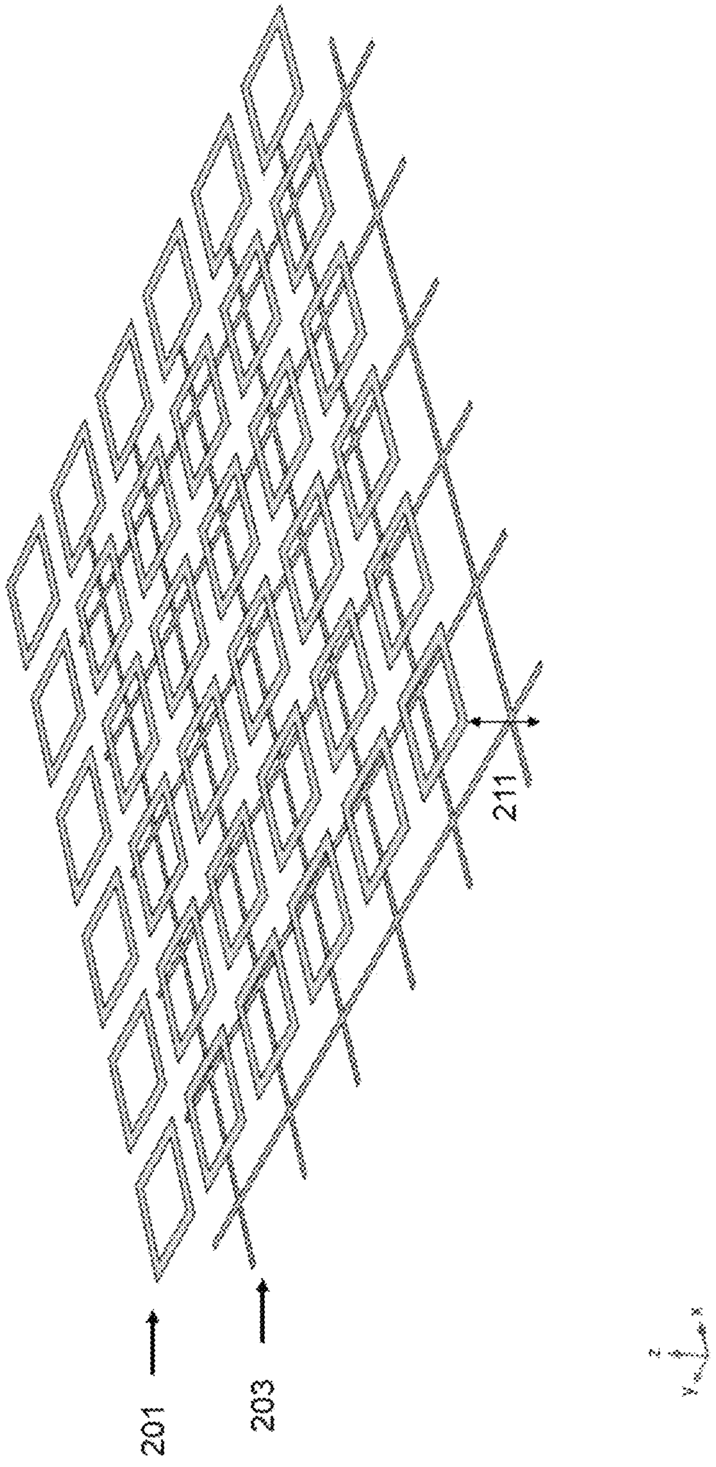
FIG. 2B is the resulting fabric-based metamaterial system is a periodic array of these unit cells, from FIG. 2A, resulting in two fabric metamaterial layers.

Band-reject metamaterial fabric layers can also be used to create a fabric metamaterial system that can adjustably change from a transmissive fabric-based metamaterial to a reflective fabric-based metamaterial, or vice versa, in a desired frequency band. FIG. 2A are two square unit cells that comprises an adjustable fabric metamaterial system made of two layers of fabric metamaterials with the first layer comprised of a band-reject metamaterial cell. The two unit cells, 201 and 203, represent fabric unit cells on independent fabric layers that can be separated for the purposes of changing its frequency response. The two layers are vertically separated by a distance 211 by either inserting a set of RF transparent fabric in between to achieve the appropriate distance 211 or are held at that distance through the application of some thick adhesive or a hook and loop/Velcro® mechanism. Changing the distance 211 by inserting or removing different layers of RF transparent fabric to mechanically control a property of the fabric-based metamaterial system that includes frequency band and magnitude of transmissivity, reflection, absorption, and phase. The square unit cell on the first layer, 201, has a periodicity ‘p’ and is made of an outer non-conductive fabric loop 207 with width ‘w1’, an inner non-conductive fabric patch 213, and a conductive fabric loop 205 of width ‘w2’. The second metamaterial layer unit cell, 203, has the same periodicity ‘p’ and is made of a conductive grid 202 with width ‘wc’ with the remaining fabric sections of the cell 214 not conductive. The unit cells, 201 and 203, do not have to have identical periodicities and can have periodicities that are different, or dimensional multiples of each other. FIG. 2B is the resulting fabric-based metamaterial system comprised of a periodic array of these unit cells, from FIG. 2A, resulting in two fabric metamaterial layers. The two fabric metamaterial layers 201 and 203 are separated by the distance 211 and can independently removed or re-attached to adjust its RF response.

Figure 2C:
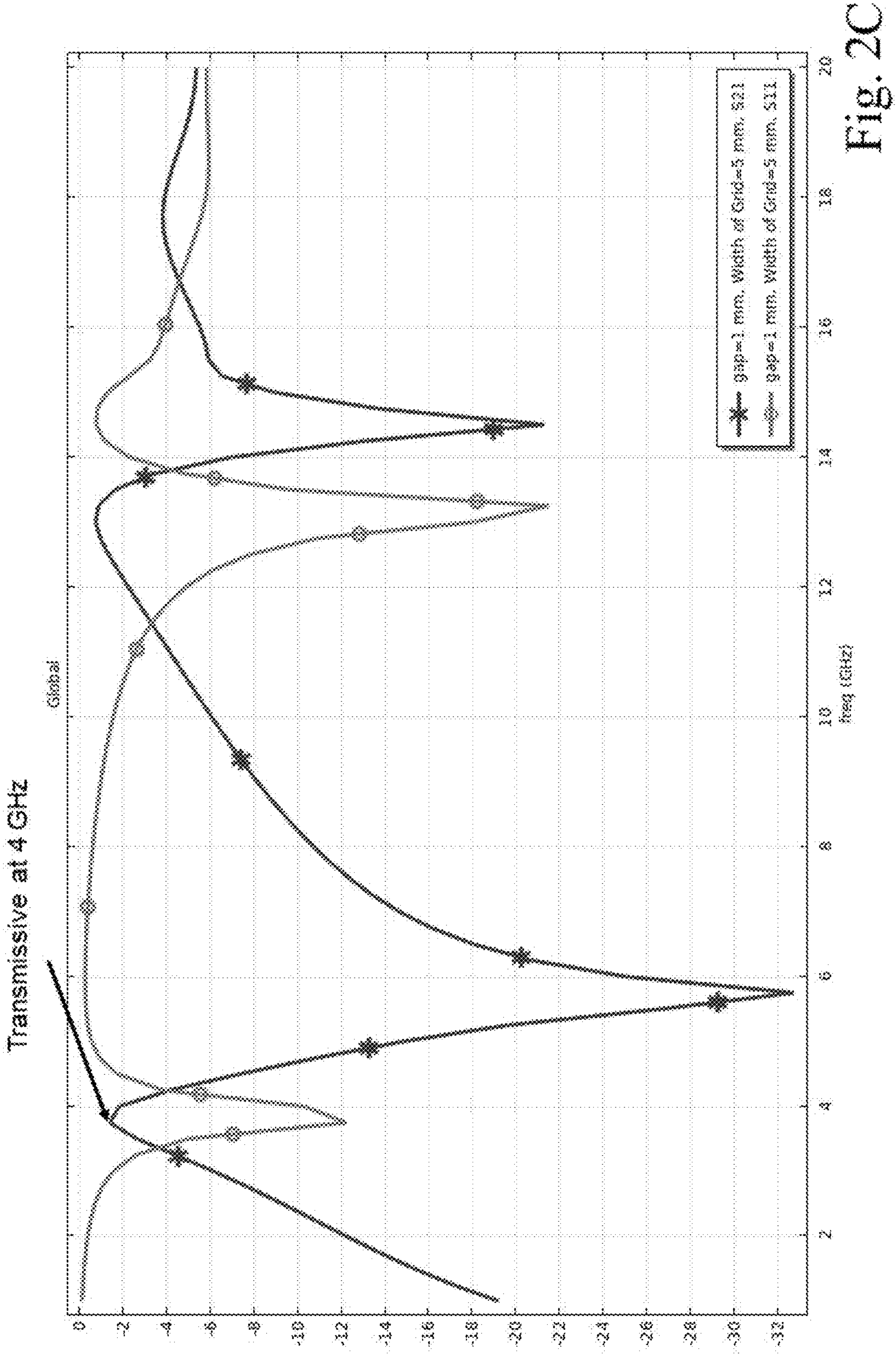
FIG. 2C illustrates the fabric metamaterial system of FIG. 2A having a band-pass response with a transmissive band at approximately 4 GHz.
Figure 2D:
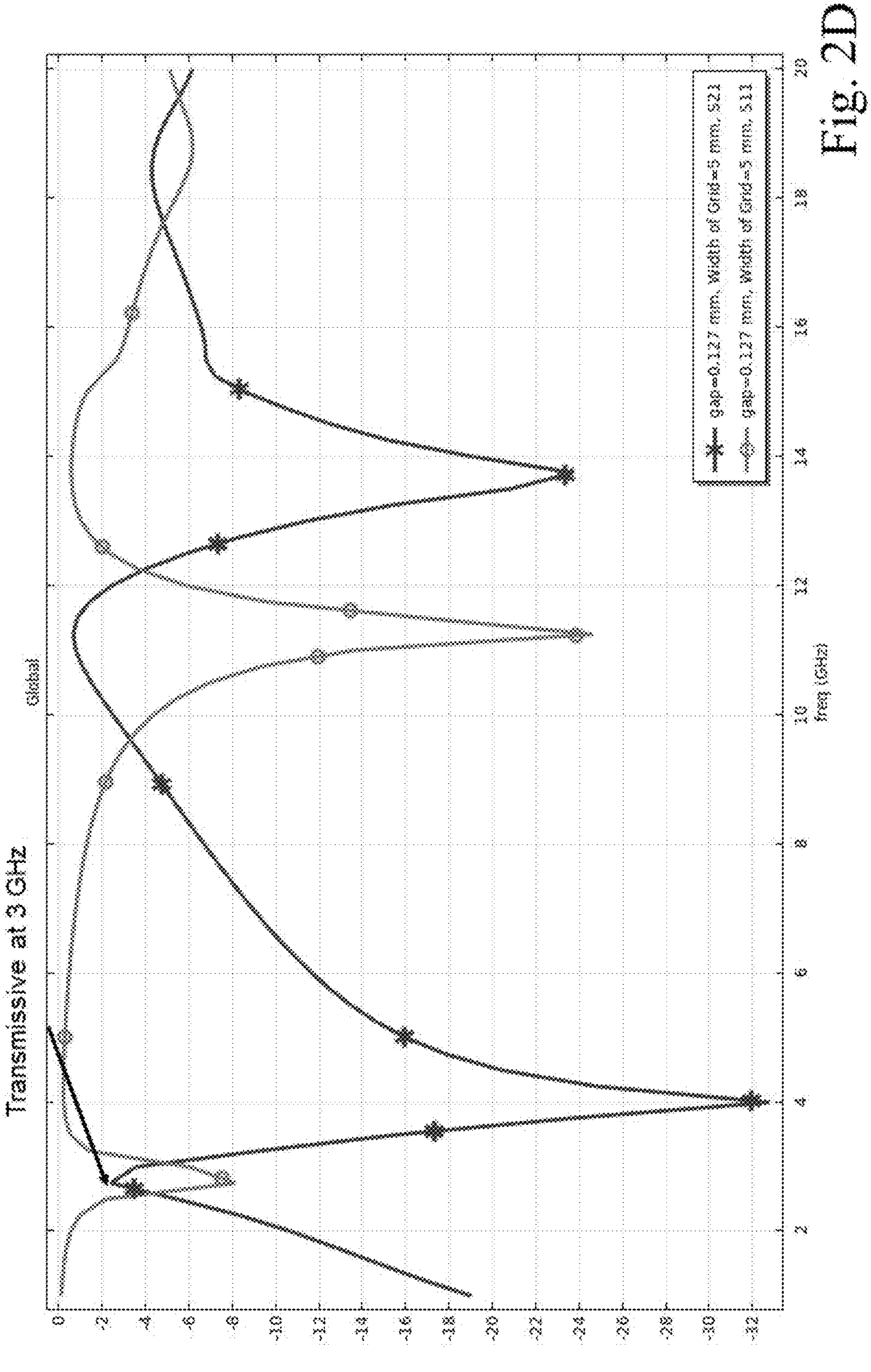
FIG. 2D illustrates that by using a thinner RF transparent fabric or by bringing the two fabric layers closer together to reduce the separation between the two layers, changes the band-pass response and transmission frequency band from 4 GHz to 3 GHz confirming that modifying the distance of the two layers by using thicker/thinner RF transparent fabrics or inserting/removing RF transparent fabric layers can change the frequency response.

FIG. 2C illustrates the fabric metamaterial system of FIG. 2A having a band-pass response with a transmissive band at approximately 4 GHz. The fabric metamaterial system of FIG. 2A has the two fabric metamaterial layers separated by a distance due to an RF transparent fabric or some other means. FIG. 2D illustrates that by using a thinner RF transparent fabric or by bringing the two fabric layers closer together to reduce the separation between the two layers, changes the band-pass response and transmission frequency band from 4 GHz to 3 GHz confirming that modifying the distance of the two layers by using thicker/thinner RF transparent fabrics or inserting/removing RF transparent fabric layers can change the frequency response.

Figure 2E:
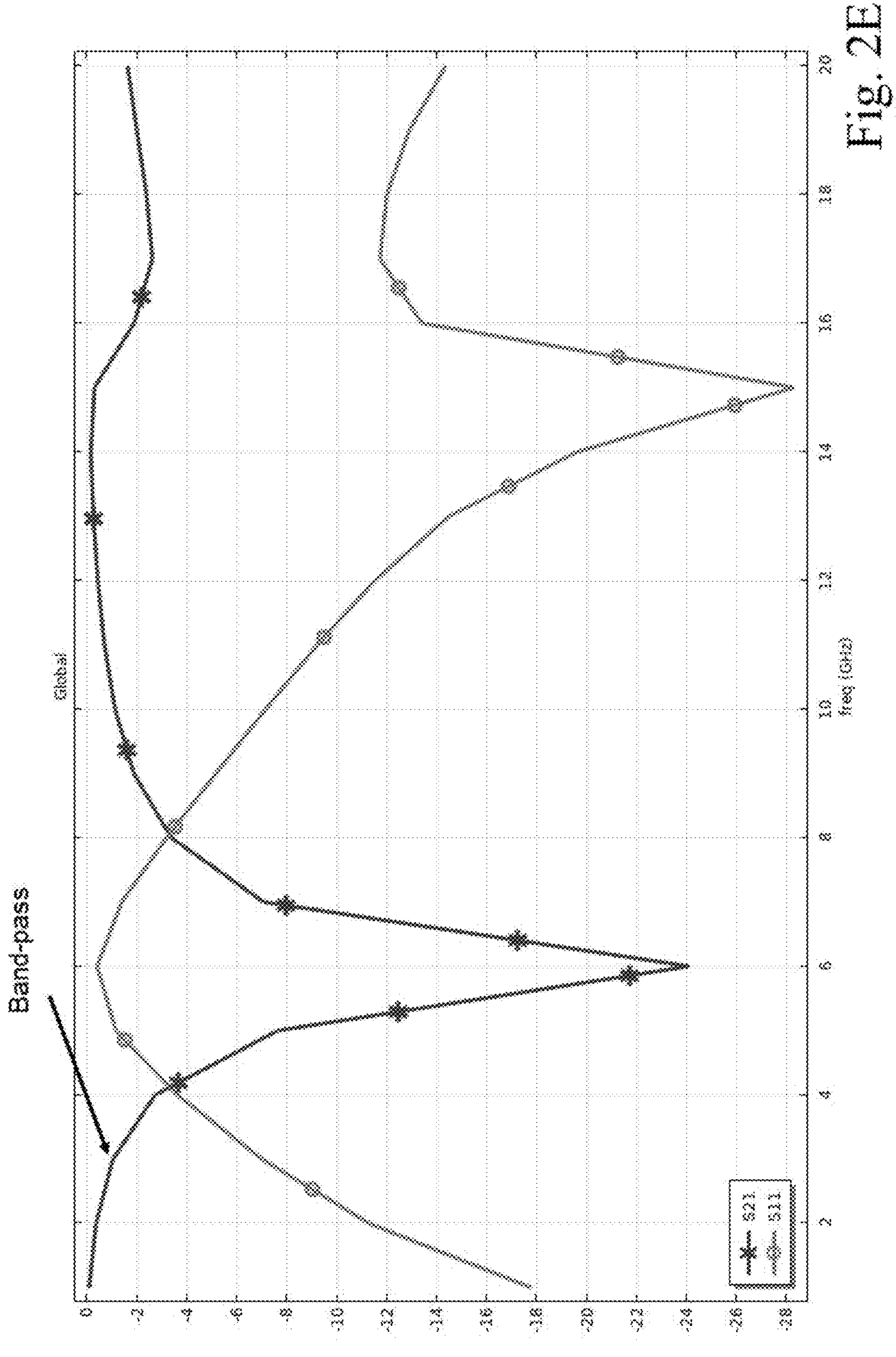
FIG. 2E illustrates that by removing the second layer completely, the band-reject frequency response below 2 GHz of FIG. 2C and FIG. 2D are both converted to a band-pass below 2 GHz.
Figure 2F:
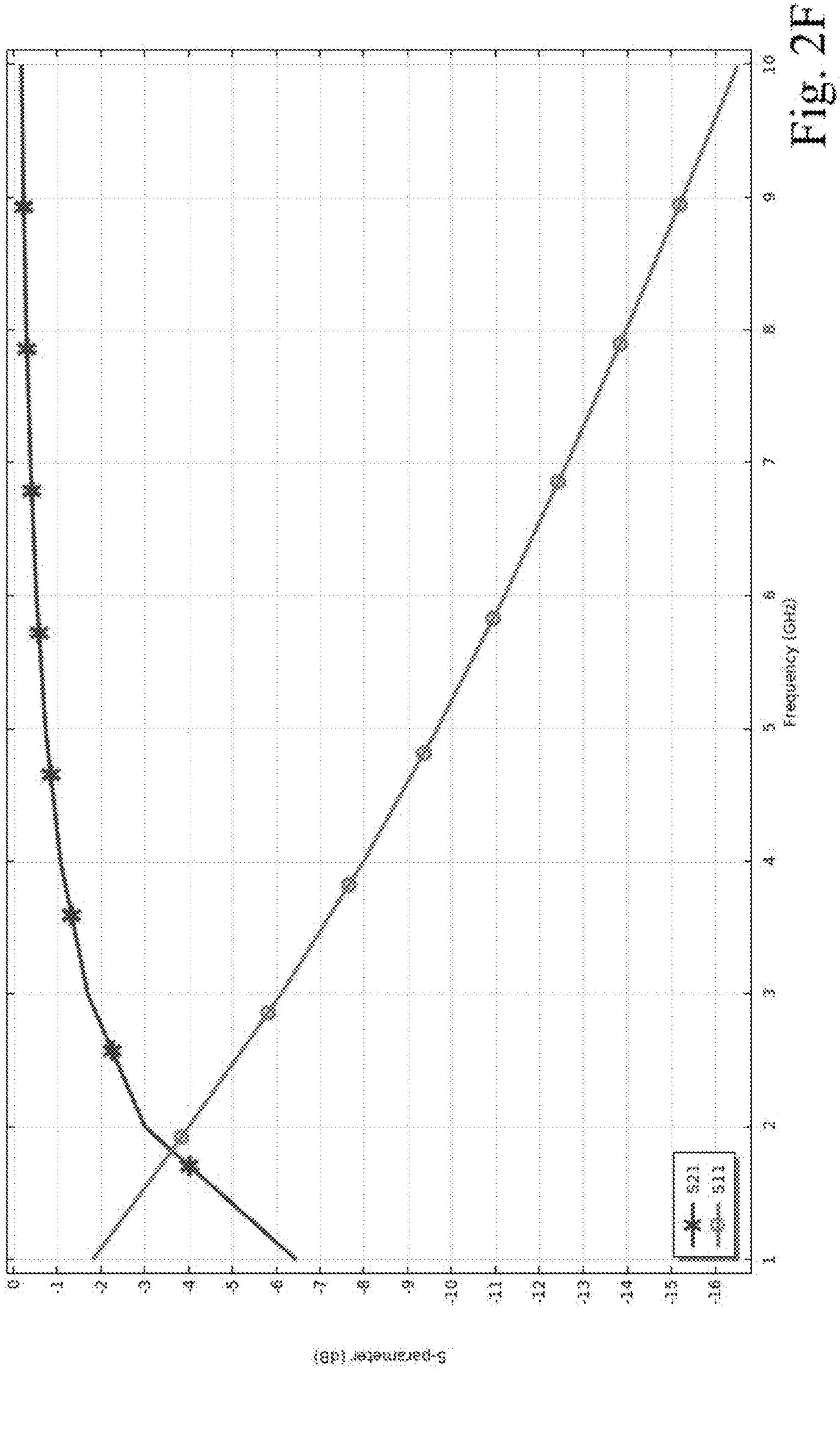
FIG. 2F illustrates the high pass filter characteristics obtained by remove the first layer of the two-layer fabric metasurface system of FIG. 2A.

The fabric metamaterial system of FIG. 2C and FIG. 2D has a band-reject frequency response below 2 GHz. FIG. 2E illustrates that by removing the second layer completely, the band-reject frequency response below 2 GHz of FIG. 2C and FIG. 2D are both converted to a band-pass below 2 GHz. This illustrates the reconfigurable nature of converting a band-reject to a band-pass filter by removing one of the two layers, in this case, the second. FIG. 2F illustrates the high pass filter characteristics obtained by remove the first layer of the two-layer fabric metasurface system of FIG. 2A.

Figure 3:
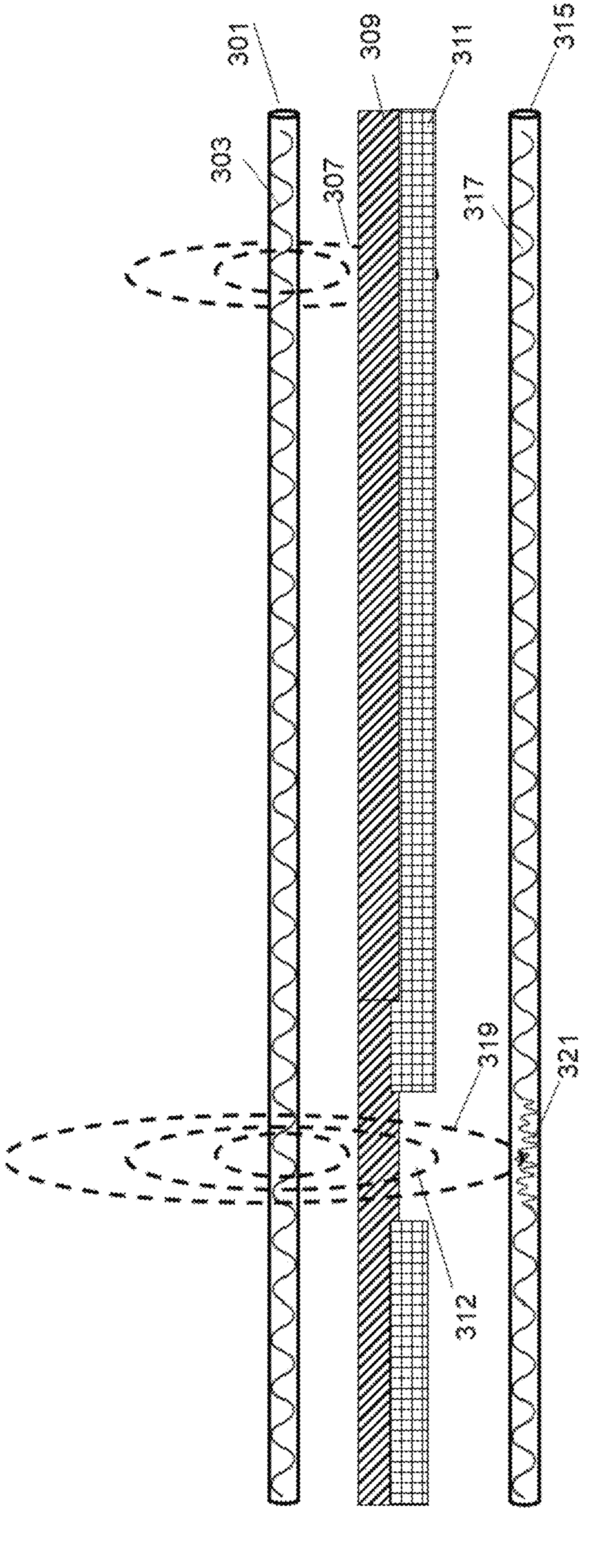
FIG. 3 is another embodiment in which the fabric-based metamaterial system is used to controllably reduce electromagnetic emissions in some regions and controllably allow coupling in other regions between power or signal carrying conductors in desired fabric items.

FIG. 3 is another embodiment in which the fabric-based metamaterial system is used to controllably reduce electromagnetic emissions in some regions and controllably allow coupling in other regions between power or signal carrying conductors in desired fabric items. The fabric-based system consisting of two layers, 309 and 311, are configured to be a band-reject filter blocking the emanating RF interference 307 generated by the signal 303 in the current carrying conductor 301. The RF interference is blocked from interfering with the signal 317 in the neighboring current carrying conductor 315. By reconfiguring the fabric-based metamaterial system to be a band-pass, in this case depicted by removing the fabric-based metamaterial 312 to allow RF energy to be coupled from 319 to the current carrying signal 317 as shown in 321. This would be desirable for coupling communication lines or for wireless power purposes.

Figure 4:
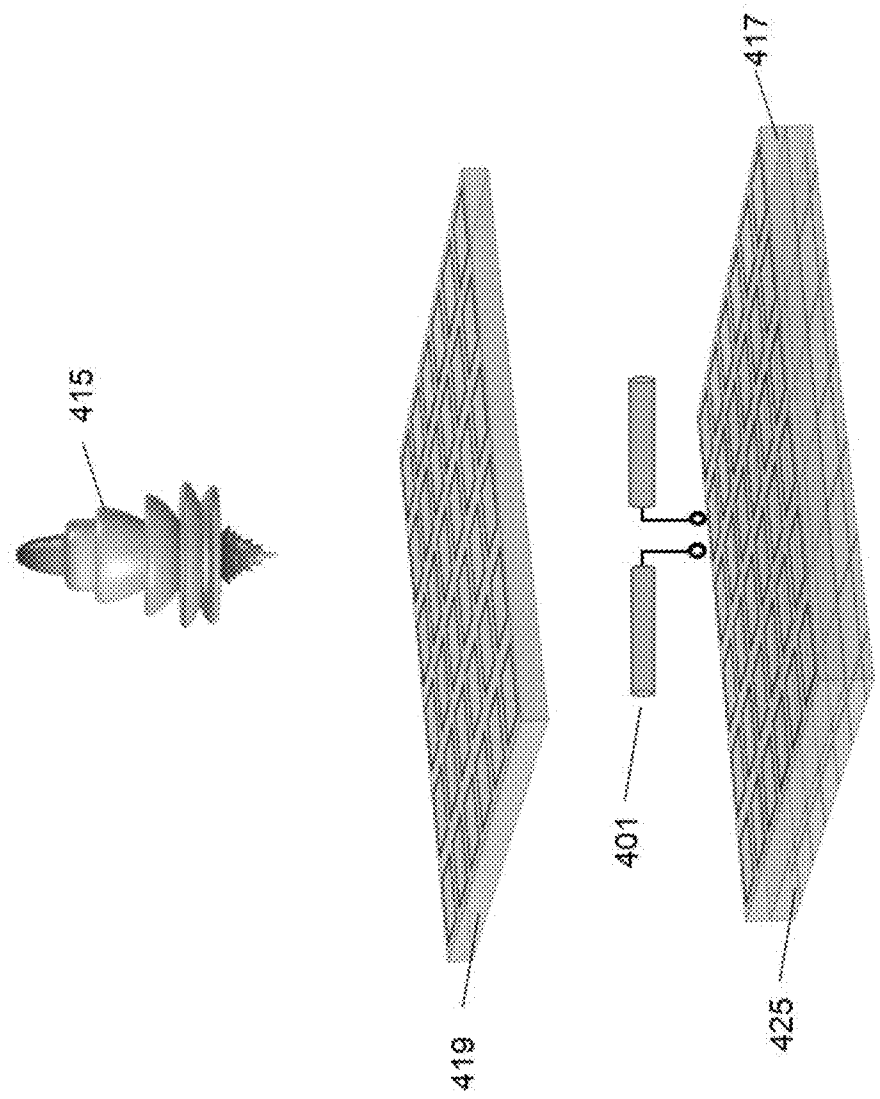
FIG. 4 is another embodiment in which the radiation pattern of an antenna can be modified with the use of fabric-based metamaterial systems to be placed in different configurations around the antenna to obtain a desired antenna pattern.

FIG. 4 is another embodiment in which the radiation pattern of an antenna can be modified with the use of fabric-based metamaterial systems to be placed in different configurations around the antenna to obtain a desired antenna pattern. The antenna shown, 401, is an omnidirectional dipole antenna but can also be a directional antenna. By using a fabric metamaterial behind the antenna 425, it acts as a back plane making an omnidirectional antenna pattern more directional 415. The fabric-based metamaterial system of 425 can also be used to control the back and side lobes of a directional antenna used in place of 401. The fabric-based metamaterial in front of the antenna, 419, can also be configured to be transparent, absorptive, or reflective to change the antenna pattern in the direction below 425.

Figure 5:
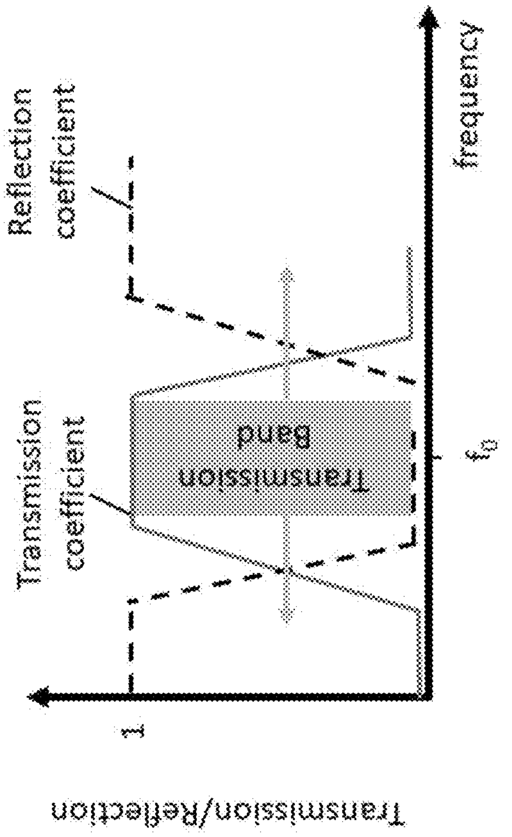
FIG. 5 is the frequency response of a band-pass metamaterial with a passband centered at a frequency $f_0$, which serves as a building block for more sophisticated metamaterial systems.
Figure 6:
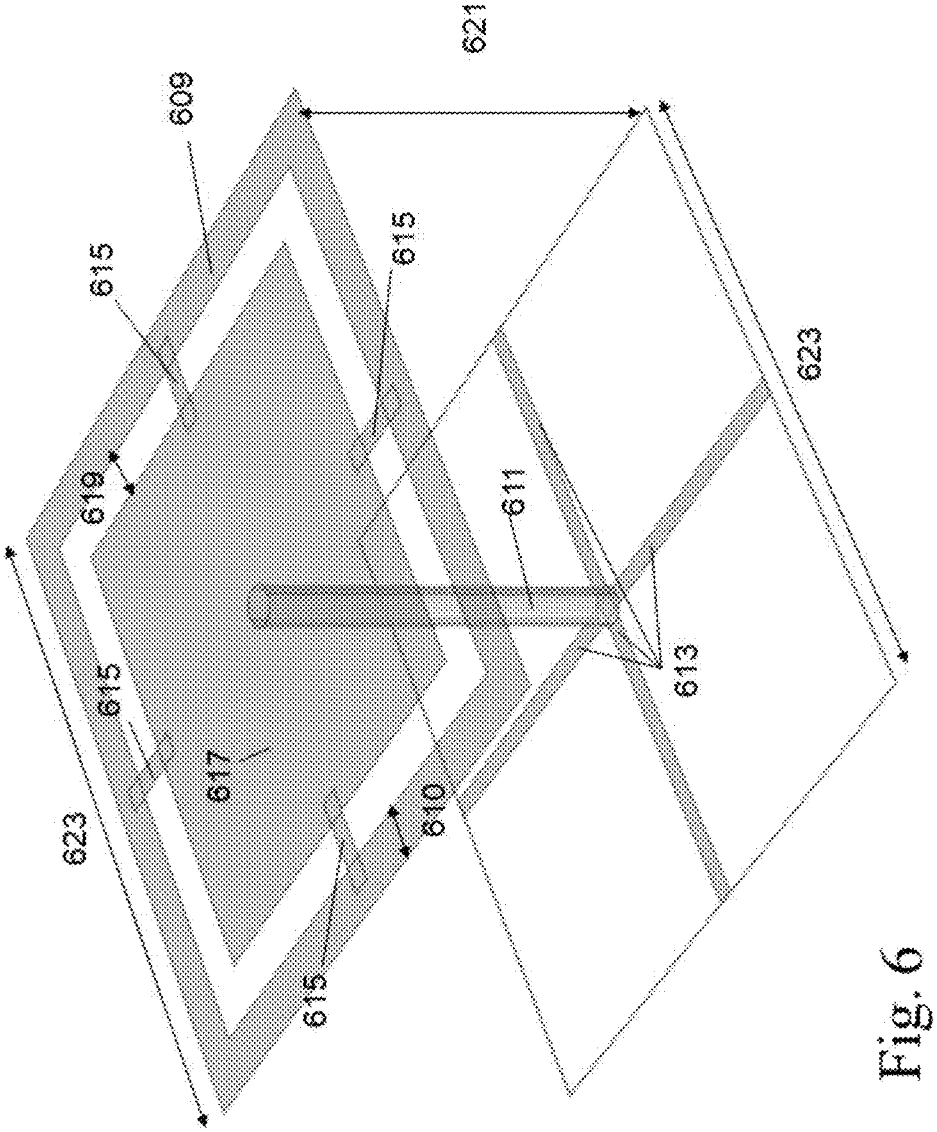
FIG. 6 is a perspective rendering of such a frequency selective structure with a periodic cell having a square element structure with electronic components configured to form an active band-pass metamaterial unit with dimensions that control a property of the active band-pass metamaterial in accordance with an embodiment of the present invention.
Figure 7:
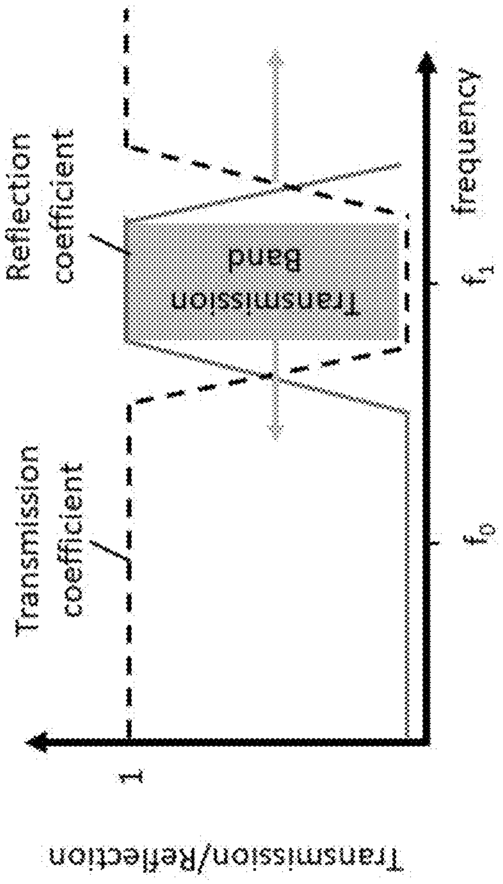
FIG. 7 illustrates how the passband can be fixed or adjusted to switch or tune to another frequency $f_1$.

The frequency response of a metamaterial system can be obtained by combining the RF properties of the individual metamaterial layers that comprise it. FIG. 5 is the frequency response of a band-pass metamaterial with a passband centered at a frequency $f_0$, which serves as a building block for more sophisticated metamaterial systems. Any suitable frequency selective surface structure can be used to create this band-pass metamaterial. FIG. 6 is a perspective rendering of such a frequency selective structure with a periodic cell having a square element structure with electronic components configured to form an active band-pass metamaterial unit with dimensions that control a property of the active band-pass metamaterial in accordance with an embodiment of the present invention. The shaded regions 609, 617, 613 and 611 identify conductive media. Parameters of the unit such as width 610 of outer square loop, width 619 of the non-conductive gap, the dimension 623 of a spatial period of the unit, the height 621 of the substrate separating the bottom grid and top periodic structure etc. determine the filter characteristics (such as resonant frequency, bandwidth etc.) of the unit. The distance between the layers and between the elements can be controlled to change the frequency response. Below the element aperture layer including conductive regions 609, 617, and 611 is another grid layer 613. The two layers are connected by a via or metal post 611. To affect characteristics of the metamaterial, electronic components such as PIN, PN, transistors (BJT, MOSFET etc.), lumped inductors and capacitors and varactor diodes, or combinations of these elements connected alone, in series, in parallel or combinations of series and parallel, are placed across the non-conductive gap 615 such that these elements are effectively connected in a parallel circuit with an applied voltage on a single top layer 609 and the bottom layer grid layer 613 grounded. The PN, PIN, varactor diodes can be arranged to be forward, reverse biased or a combination distributed around the ring or through other bottom grid layers and top layers. FIG. 7 illustrates how the passband can be fixed or adjusted to switch or tune to another frequency $f_1$, in this case to be greater than $f_0$.

Figure 8A:
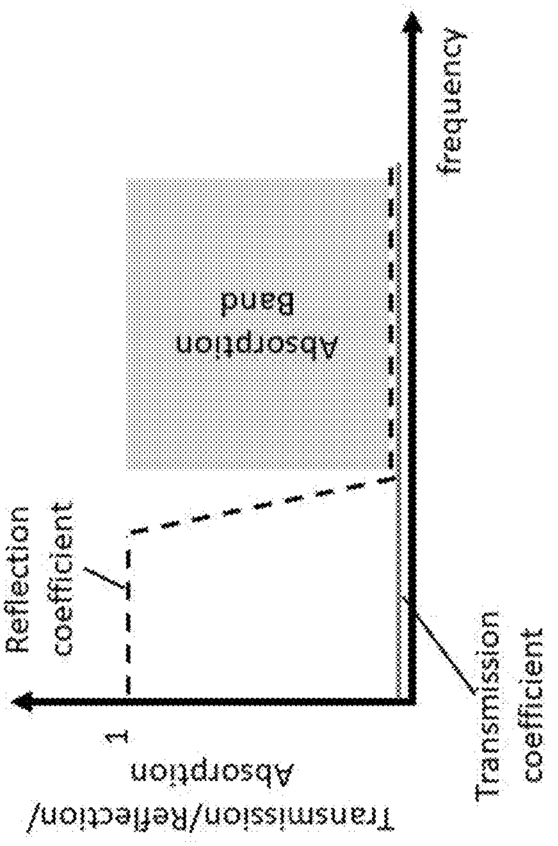
FIG. 8A illustrates the frequency characteristics of an absorptive metamaterial layer with an absorptive frequency band. Any suitable absorptive frequency selective structure can be used for the absorptive layer.
Figure 8B:
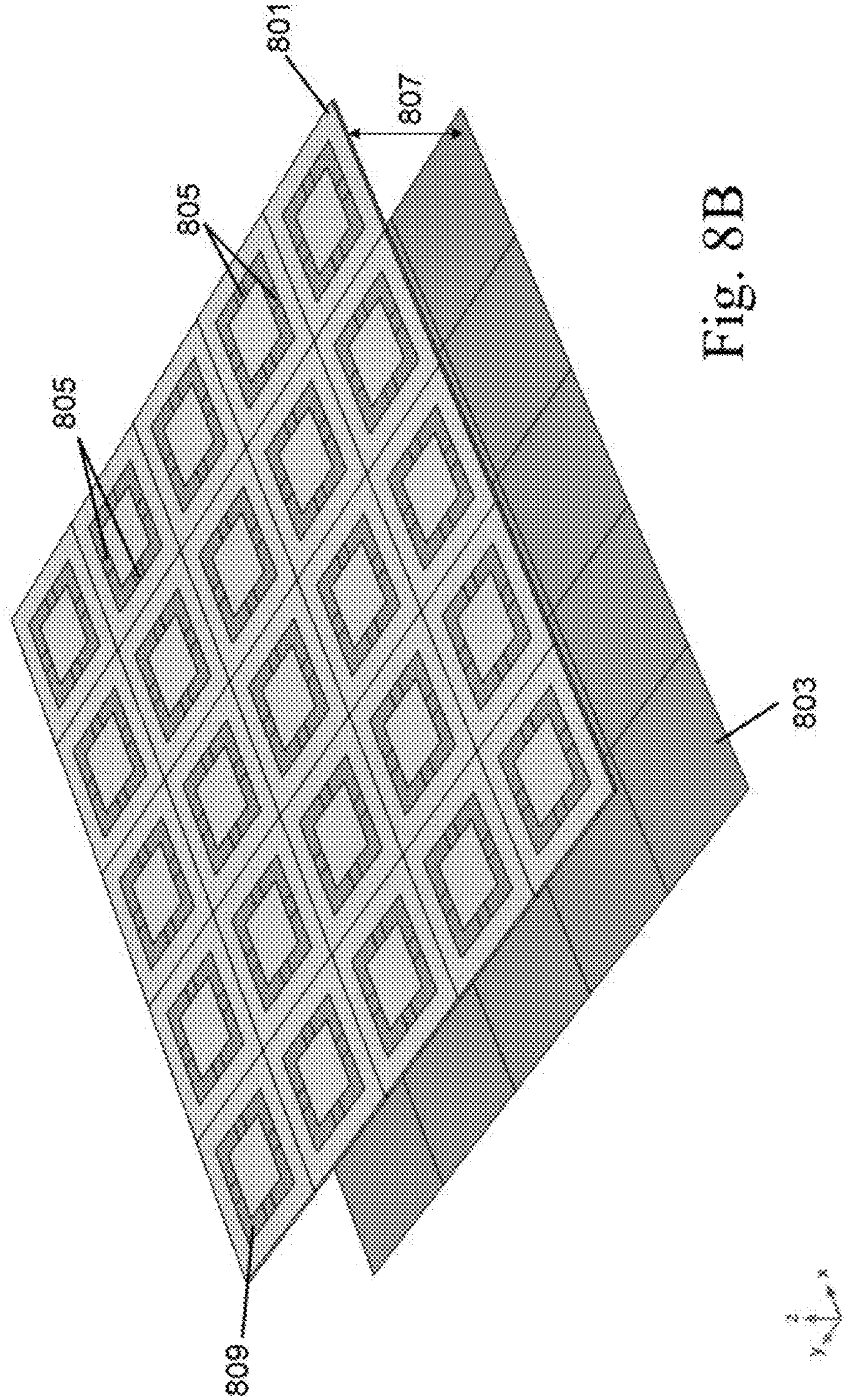
FIG. 8B illustrates the construction of a metamaterial absorber, constructed of a top band-reject layer, similar to the unit cells in FIG. 2A, with the conductive traces and lumped resistors electrically connected.
Figure 8C:
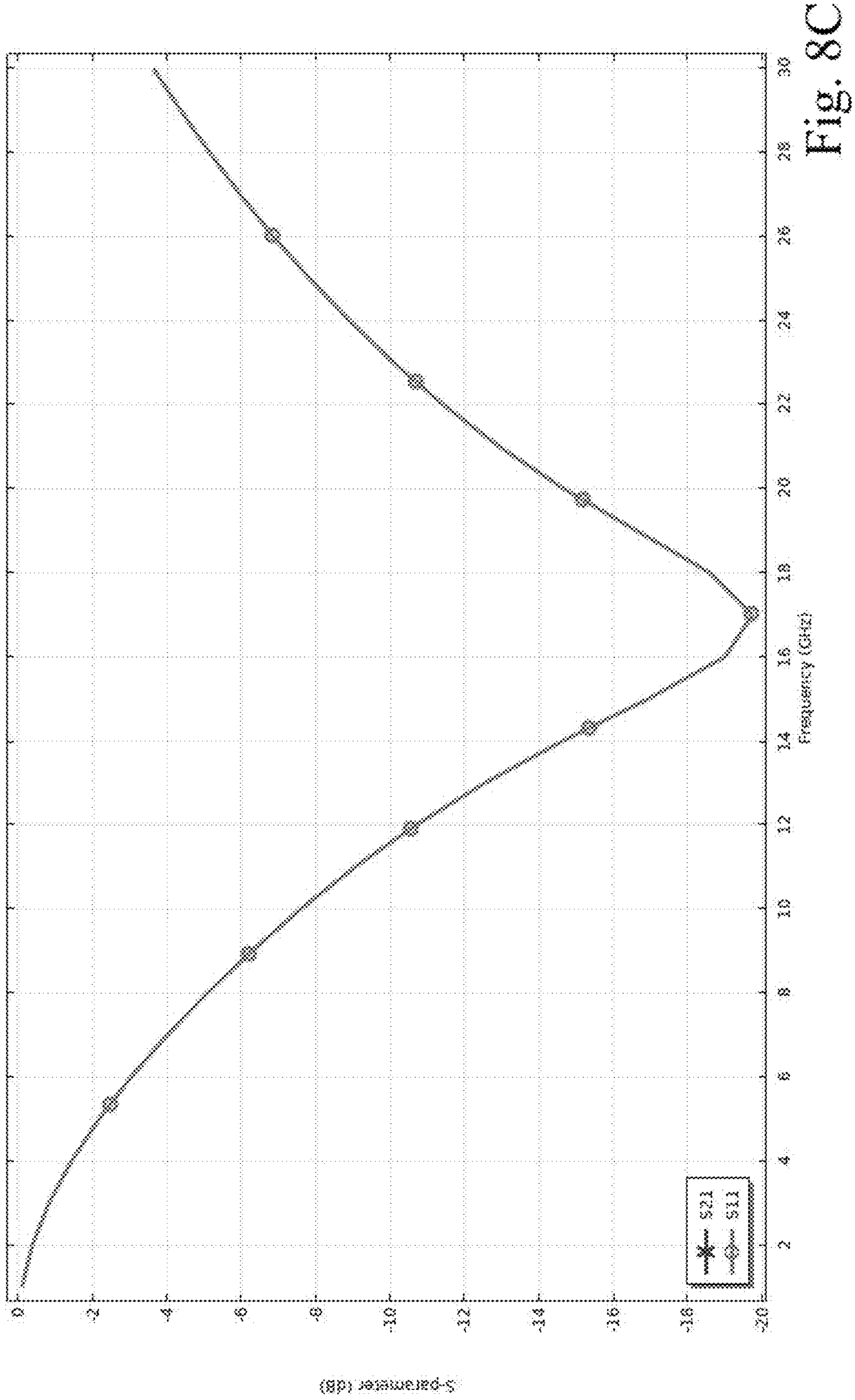
FIG. 8C illustrates the absorption characteristics of a narrowband metamaterial absorber system, tuned to be maximally absorptive at 17 GHz, where the conductivity of the conductive sections of the band-reject layer is 1E5 S/m and placed on top of a fully conductive layer resulting in no transmission of RF energy through (no S21 response).
Figure 8D:
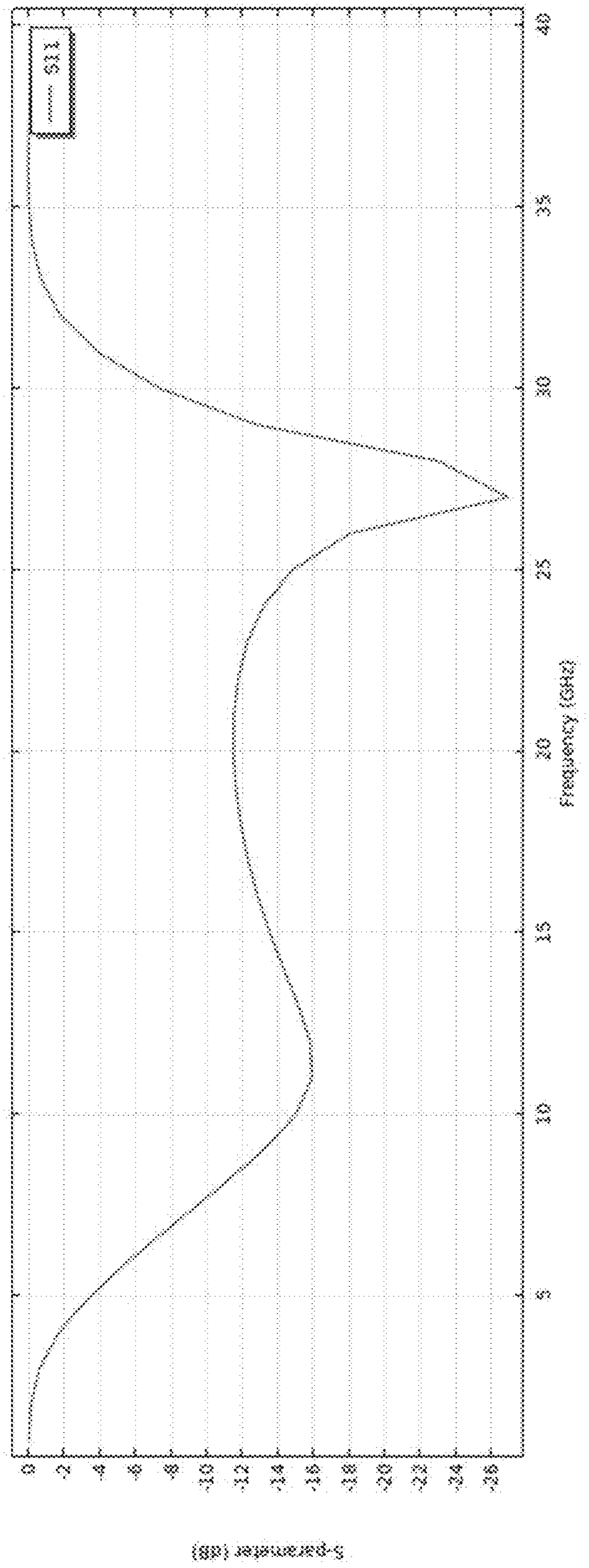
FIG. 8D illustrates the absorption characteristics of a wideband metamaterial absorber spanning frequencies from X band through to Ka band.

Another building block is the use of an absorptive metamaterial layer with an absorptive frequency band. The energy of an RF wave impinged on a metamaterial surface has to be equal to the total energy represented by a reflected, transmitted, and absorbed RF wave as a result of its interaction with the metamaterial. A metamaterial absorbs the RF wave when both the transmission and reflection coefficients are low. FIG. 8A illustrates the frequency characteristics of an absorptive metamaterial layer with an absorptive frequency band. Any suitable absorptive frequency selective structure can be used for the absorptive layer. This includes a band-pass or band-reject layer on the first layer facing the impinged RF energy with a second ground plane to ensure that there is no transmission of RF energy through the material. FIG. 8B illustrates the construction of a metamaterial absorber, constructed of a top band-reject layer 801, similar to the unit cells in FIG. 2A, with the conductive traces 809 and lumped resistors 805 electrically connected. The same resistive conductive trace can be also manufactured using direct write of conductive inks of a specified resistivity. The two layers are separated by a height 807. This separation distance must be maintained to maintain the frequency response of absorption by using a filler RF transparent layer or transparent fabric layer or by other means. The second fully conductive layer, 803, underlies the first layer and prevents the RF energy from transmitting through. FIG. 8C illustrates the absorption characteristics of a narrowband metamaterial absorber system, tuned to be maximally absorptive at 17 GHz, where the conductivity of the conductive sections of the band-reject layer is 1E5 S/m and placed on top of a fully conductive layer resulting in no transmission of RF energy through (no S21 response). FIG. 8D illustrates the absorption characteristics of a wideband metamaterial absorber spanning frequencies from X band through to Ka band.

Figure 8E:
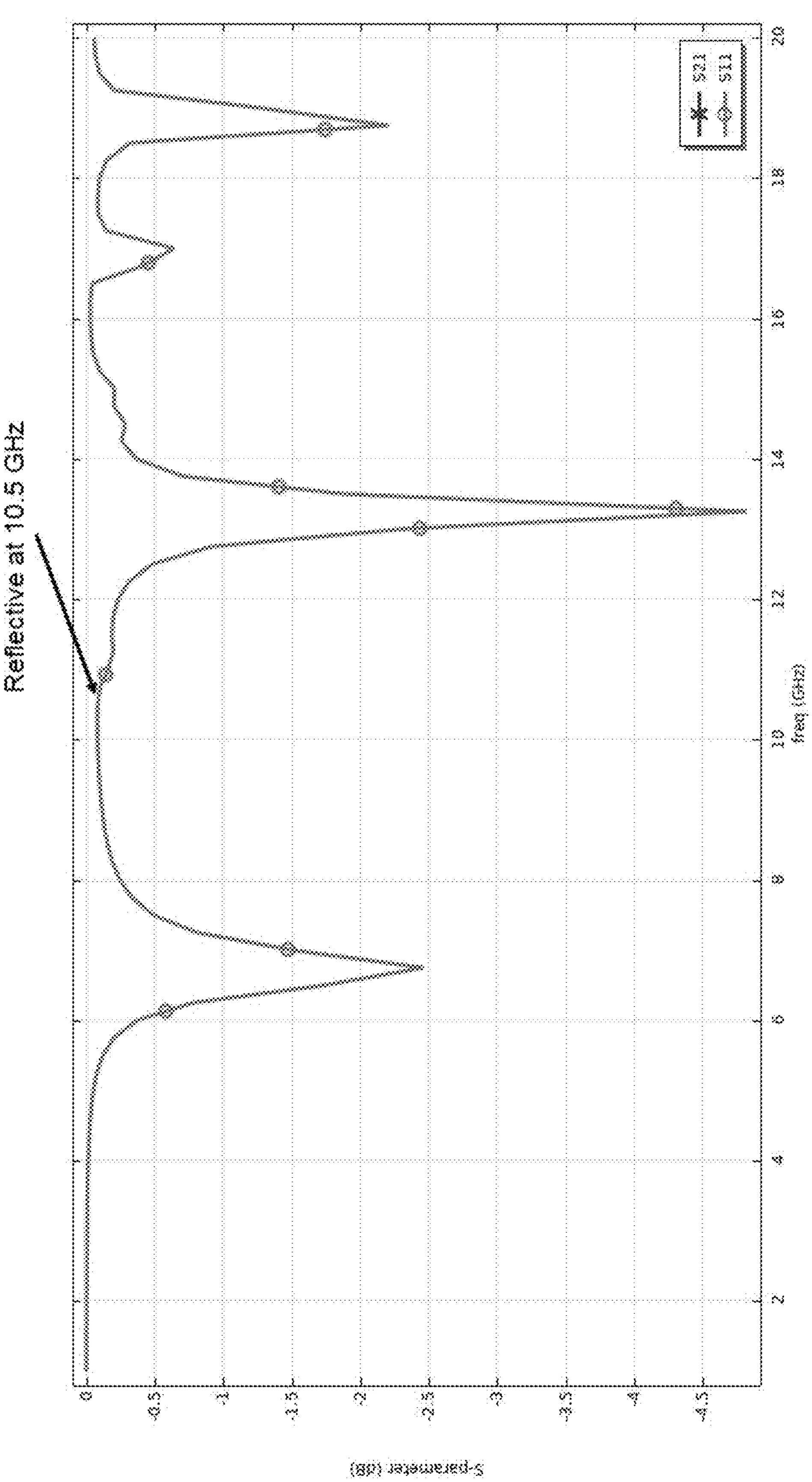
FIG. 8E illustrates the S parameter plot of a controllable absorber configured in one state to be reflective to 10.5 GHZ, a frequency commonly used by most X band radar systems.
Figure 8F:
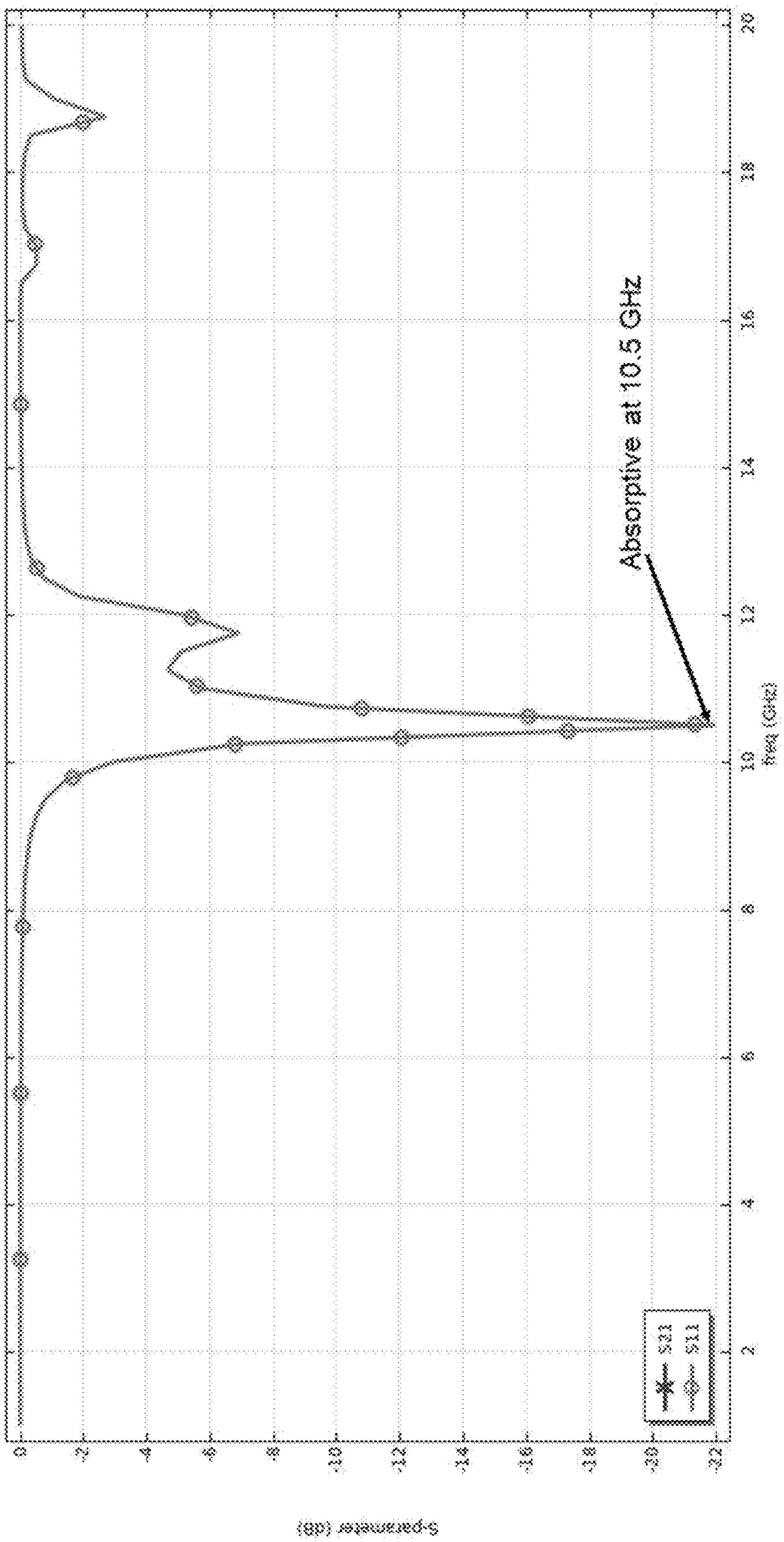
FIG. 8F illustrates the S parameter plot of the controllable absorber configured such that the band-pass metamaterial layer is transmissive at 10.5 GHZ, to be absorbed by the absorptive layer.

Using the building blocks of a controllable band-pass metamaterial layer from FIG. 6 and the RF absorber from FIG. 8B, an electronically controllable metamaterial absorber structure can be constructed by placing the controllable band-pass metamaterial layer some distance above the metamaterial absorber in the two-layer metamaterial system. This structure can in one electronic configuration be made to be fully reflective to an impinged RF wave, of a specific desired frequency band, by controlling the band-pass layer to be reflective. In this configuration, the impinged RF wave does not pass through the first metamaterial layer to get absorbed by the second absorptive metamaterial layer and is reflected off the surface. FIG. 8E illustrates the S parameter plot of a controllable absorber configured in one state to be reflective to 10.5 GHZ, a center frequency commonly used by most X band radar systems. Since no energy passes through the controllable absorber, the S21 plot has too low a magnitude to show up on the plot. The controllable absorber can be configured in another configuration, such that the band-pass metamaterial layer is subsequently controlled to be transmissive at the specific desired frequency band of the impinged RF wave and the absorptive metamaterial layer is designed to be absorptive at the same desired frequency band, the impinged RF wave passes through the first metamaterial layer and is absorbed by the second absorptive metamaterial layer. FIG. 8F illustrates the S parameter plot of the controllable absorber configured such that the band-pass metamaterial layer is transmissive at 10.5 GHZ, to be absorbed by the absorptive layer. The resulting plot shows that there is no measurable S21 response, and the reflection coefficient (S11) is significant (~20 dB) at 10.5 GHz. If the absorptive layer is not designed to be absorptive at the band-pass transmissive frequency and is instead reflective, then the impinged wave will reflect from the absorptive layer and pass through the first metamaterial layer back to the source of the impinged RF wave. The band-pass layer can be controlled through an applied voltage to tune the varactor diode, PIN/PN diode, or FET based metamaterial to be reflective or transmissive at the frequency band of the impinged RF wave. By using multiple individually addressable controllable metamaterial absorber systems and covering an object with these metamaterial layers, the radar cross section of the object can be dynamically and electronically controlled.

Figure 9B:
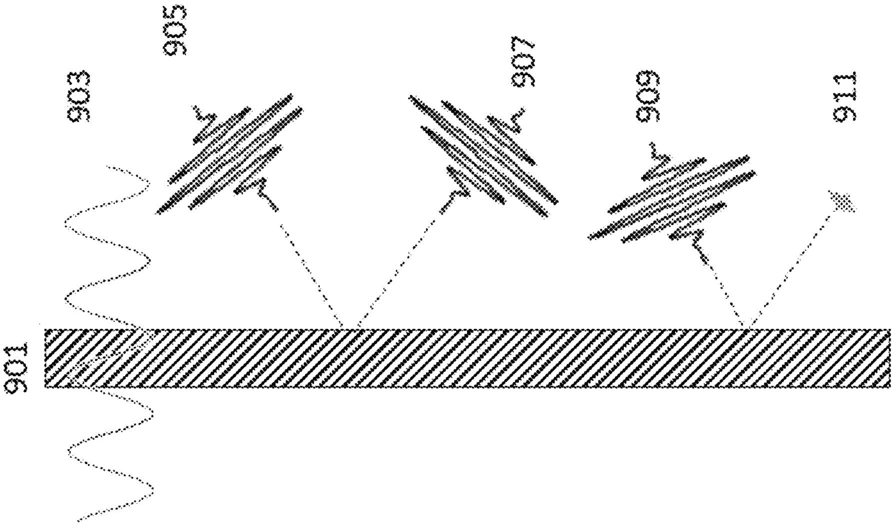
FIG. 9B shows how the metamaterial system, gives the vehicle a controllable RF response that can be utilized to control its Radar Cross Section (RCS) by increasing or decreasing its RCS.
Figure 9A:
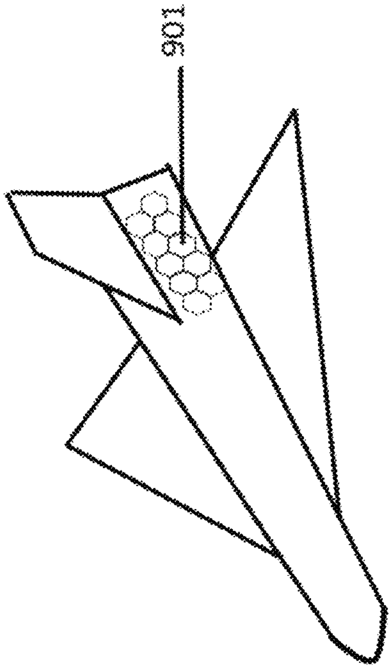
FIG. 9A is an embodiment that illustrates using the controllable absorber metamaterial system, constructed using these building blocks, to be integrated on a vehicle as part of its fuselage.

FIG. 9A is an embodiment that illustrates using the controllable absorber metamaterial system, constructed using these building blocks, to be integrated on a vehicle as part of its fuselage. The metamaterial system with comprising metamaterial layers is tiled 901 as part of the fuselage either on the inside (if the fuselage is RF transparent) or on the outside of the fuselage of the vehicle. FIG. 9B shows how the metamaterial system 901, gives the vehicle a controllable RF response that can be utilized to control its Radar Cross Section (RCS) by increasing or decreasing its RCS. For instance, an impinged radar wave 905 reflects the impinged RF energy back 907 when the metamaterial system is configured in one configuration to be reflective. In the second configuration, the impinged radar wave 909 is absorbed by the metamaterial system configured to be absorptive reflecting very little or no RF energy back 911.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A fabric-based metamaterial system comprising:

a first layer including a first fabric-based metamaterial that is normally reflective; and a second layer including a second fabric-based metamaterial, the second layer underlying a region of the first layer in a manner as to render the first layer transmissive in the region and wherein the second layer is configured to be removed from and attached to the first layer in a manner as to adjust frequency response of the system.

2. A method of modifying properties of a region of a first fabric-based metamaterial that is normally reflective over a relevant frequency band, the method comprising:

positioning a second fabric-based metamaterial beneath the region of the first normally reflective fabric-based metamaterial in a manner as to render the region transmissive over the relevant frequency band, wherein the second layer is configured to be removed from and attached to the first fabric-based metamaterial in a manner as to adjust frequency response of the system.

3. A method of modifying properties of the first fabric-based metamaterial according to claim 2, wherein a selected one of the first and second fabric-based metamaterials is stretchable, the method comprising stretching the selected one of the fabric-based metamaterials.

4. A fabric-based metamaterial system according to claim 1 in which the metamaterial system is incorporated in an item selected from the group consisting of an item of apparel, a tent, a parachute, a bag, and an enclosure.

5. A fabric-based metamaterial system according to claim 1, wherein the second layer is configured (i) to be removable so that when it has been removed it no longer underlies the first layer and (ii) also to be attachable so that when it has been attached it underlies the first layer.

6. A fabric-based metamaterial system according to claim 1, wherein the second layer is configured (i) to be removable so that when it has been removed it no longer underlies the first layer and (ii) also to be attachable so that when it has been attached it underlies the first layer.

7. A method of modifying properties of the region of the first fabric-based metamaterial according to claim 2, the method further comprising:

removing the second fabric-based metamaterial layer from beneath the transmissive region of the first fabric-based metamaterial in a manner as to render the region of the first fabric-based metamaterial reflective over the relevant frequency band.

8. An antenna system comprising:

an antenna array;

a first layer including a first fabric-based metamaterial that is normally reflective, the first layer at least partially surrounding the antenna array; and a second layer including a second fabric-based metamaterial, wherein the second layer underlies a region of the first layer in a manner as to render the first layer transmissive in the region and wherein the second layer is configured to be re a and attached to the first layer in a manner as to adjust frequency response system; and wherein the first and second layers are configured to maintain an unchanged antenna pattern in conjunction with the antenna array.

* * * * *